(12) United States Patent
Lee et al.

(10) Patent No.: US 8,014,338 B2
(45) Date of Patent: Sep. 6, 2011

(54) APPARATUS AND METHOD FOR SUPPORTING RELAY SERVICE IN A MULTI-HOP RELAY BROADBAND WIRELESS ACCESS COMMUNICATION SYSTEM

(75) Inventors: Mi-Hyun Lee, Seoul (KR); Jae-Weon Cho, Suwon-si (KR); Sung-Jin Lee, Seoul (KR); Young-Bin Chang, Anyang-si (KR); Hyun-Jeong Kang, Seoul (KR); Joon-Young Choi, Suwon-si (KR); Chang-Yoon Oh, Yongin-si (KR); Hyoung-Kyu Lim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1147 days.

(21) Appl. No.: 11/788,388

(22) Filed: Apr. 19, 2007

(65) Prior Publication Data
US 2007/0281613 A1      Dec. 6, 2007

(30) Foreign Application Priority Data

Apr. 19, 2006 (KR) .................. 10-2006-0035239
Nov. 13, 2006 (KR) .................. 10-2006-0111903
Nov. 14, 2006 (KR) .................. 10-2006-0112350

(51) Int. Cl.
*H04B 7/14* (2006.01)
(52) U.S. Cl. ........................ 370/324; 370/332
(58) Field of Classification Search ............... 455/11.1, 455/13.2; 370/315, 324, 328, 332
See application file for complete search history.

(56) References Cited

U.S. PATENT DOCUMENTS
6,131,084 A    10/2000    Hardwick

FOREIGN PATENT DOCUMENTS

| | | |
|---|---|---|
| DE | 101 45 759 | 4/2003 |
| JP | 8-331107 | 12/1996 |
| JP | 2002-335204 | 11/2002 |
| JP | 2007-184935 | 7/2007 |
| KR | 1020030057467 | 7/2003 |
| RU | 2 214 048 | 10/2003 |
| WO | WO 01/26269 | 4/2001 |
| WO | WO 03/055246 | 7/2003 |
| WO | WO 2004/021607 | 3/2004 |

OTHER PUBLICATIONS

Mitsuo Nohara et al., "Mobile Multi-Hop Relay Networking in IEEE 802.16", Jul. 13, 2005.
Xiaobing Leng et al., "A Frame Structure for Mobile Multi-Hop Relay With Different Carrier Frequencies", Nov. 11, 2005.
Ralf Pabst et al., "Relay-Based Deployment Concepts for Wireless and Mobile Broadband Radio", Wireless World Research Forum, IEEE Communications Magazine, Sep. 2004.

(Continued)

*Primary Examiner* — Sam Bhattacharya
(74) *Attorney, Agent, or Firm* — The Farrell Law Firm, P.C.

(57) ABSTRACT

An apparatus and method for configuring a subframe to support a relay service in a multi-hop relay BWA communication system are provided. The apparatus includes at least one of a BS-MS link subframe, a primary RS-MS link subframe, and a BS-secondary RS link subframe are configured in a first period of the subframe, and at least one of a BS-primary RS link subframe, an RS-RS link subframe, and a secondary RS-MS link subframe is configured in a second period of the subframe.

70 Claims, 19 Drawing Sheets

OTHER PUBLICATIONS

Youngbin Chang et al: "Frame Structure for Multi-hop Relay", IEEE 802.16j-06/257, Nov. 7, 2006.

Changyoon Oh et al: "On the Use of Postamble for the Relay Link, IEEE 802.16j-07/136r4", Jan. 18, 2007.

Chenxi Zhu et al: "Frame Structure to Support Relay Node Operation, IEEE 802.16j-06/233r8", Nov. 17, 2006.

Xiaobing Leng et al: "A Frame Structure for Mobile Multi-hop Relay with Different Carrier Frequencies", IEEE 802.16 Presentation Submission Template, Nov. 11, 2005.

APPARATUS AND METHOD FOR SUPPORTING RELAY SERVICE IN A MULTI-HOP RELAY BROADBAND WIRELESS ACCESS COMMUNICATION SYSTEM

PRIORITY

This application claims priority under 35 U.S.C. §119(a) to Korean Patent Applications filed in the Korean Intellectual Property Office on Apr. 19, 2006 and assigned Serial No. 2006-35239; filed in the Korean Intellectual Property Office on Nov. 13, 2006 and assigned Serial No. 2006-111903; and filed in the Korean Intellectual Property Office on Nov. 14, 2006 and assigned Serial No. 2006-112350, the contents of which are incorporated herein by reference.

BACKGROUND OF THE INVENTION

1. Field of the Invention

The present invention relates generally to a multi-hop relay Broadband Wireless Access (BWA) communication system, and in particular, to an apparatus and method for providing synchronization channels to Mobile Stations (MSs) and Relay Stations (RSs) and eliminating near-far interference between a direct service and a relay service in a multi-hop relay BWA communication system.

2. Description of the Related Art

One of the most critical requirements for deployment of a $4^{th}$ Generation (4G) communication system is to build a self-configurable wireless network. The self-configurable wireless network refers to a wireless network configured in an autonomous or distributed manner without control of a central system to provide mobile communication services. For the 4G communication system, cells of very small radiuses are defined for the purpose of enabling high-speed communications and accommodating a larger number of calls. Hence, a conventional centralized wireless network design is not viable. Rather, the wireless network should be built to be under distributed control and to actively cope with an environmental change like addition of new Base Stations (BSs). As a result, the 4G communication system requires the self-configurable wireless network.

For real deployment of the self-configurable wireless network, techniques used for an ad hoc network should be introduced to a wireless access communication system. Such a major example is a multi-hop relay BWA communication system configured by applying a multi-hop relay scheme used for the ad hoc network to a BWA network with fixed BSs.

In general, since a BS and an MS communicate with each other via a direct link, a highly reliable radio link can be established easily between them in the BWA communication system. However, due to the BSs being fixed, the configuration of a wireless network is not flexible, making it difficult to provide an efficient service in a radio environment experiencing a fluctuating traffic distribution and a great change in the number of required calls.

The above drawback can be overcome by a relay service that delivers data over multiple hops via a plurality of neighbor MSs or neighbor RSs. The use of the multi-hop relay scheme facilitates fast network reconfiguration adaptive to an environmental change and renders the overall wireless network operation efficient. Also, a radio channel in a better channel status can be provided to an MS by installing an RS between the BS and the MS and thus establishing a multi-hop relay path via the RS. In this way, high-speed data channels can be provided to MSs in a shadowing area or an area where communications with the BS are unavailable. Cell coverage can also be expanded.

FIG. 1 illustrates service provisioning in a typical multi-hop relay BWA communication system.

In FIG. 1, in the multi-hop relay BWA communication system, MSs 140 to 170 (MS1 to MS4) can receive the BWA services through a BS 100, a primary RS (RS1) 110, and secondary RSs (RS2) 120 and 130.

MS1 and MS2 within the service area 101 of the BS 100 communicate with the BS 100 via direct links L1. MS2, which is located at the cell boundary of the BS 100 and thus placed in a poor channel state, can receive a higher-speed data channel via an RS-MS link L2 between MS2 and RS2 130 than via the direct link L1.

MS3 and MS4 outside the service area 101 of the BS 100 communicate with the BS 100 via RS-MS links L3 provided by RS1 110. The communication links between the BS 100 and MS3 and MS4 via RS1 110 expand the cell coverage. MS4, which is located at the cell boundary of RS1 110 and thus placed in a poor channel state, can increase its transmission capacity using an RS-MS link L4 between MS4 and RS2 120.

As described above, when an MS is in a poor channel state at a cell boundary of a BS or in a shadowing area suffering from a severe shielding effect due to, for example, buildings, the BWA communication system enables the MS to communicate with the BS by providing a better-quality radio channel to the MS via an RS. In other words, the BS can provide high-speed data channels to the cell boundary and the shadowing area and expand its coverage area by the multi-hop relay scheme. The RSs 110, 120 and 130 are classified into RS1 (RS 110) that expands cell coverage and RS2 (the RSs 120 and 130) that increases capacity according to their relay capabilities.

Typically, transmission/reception is carried out between a BS and an MS in frames having the configuration illustrated in FIG. 2 in the BWA communication system. FIG. 2 illustrates a Time Division Duplex (TDD) frame structure compliant with Institute of Electrical and Electronics Engineers (IEEE) 802.16, for data transmission/reception between the BS and the MS.

In FIG. 2, a TDD frame 200 is divided into a DownLink (DL) subframe 210 and an UpLink (UL) subframe 220 with a guard region called Transmit/receive Transition Gap (TTG) in between. A guard region called Receive/transmit Transition Gap (RTG) is interposed between TDD frames.

The DL subframe 210 includes a preamble and a common control channel in mandatory slots. The MSs within the service area of the BS acquire synchronization and control information from the preamble and the common control channel.

As described above, the BWA communication system provides services to the MSs or RSs outside the cell coverage of the BS or in a shadowing area by use of the RSs. In order to ensure backward compatibility for the MSs, communications are conducted in frames configured as illustrated in FIG. 2. That is, an RS operates in the same manner as an MS during initial access and negotiates a relay operation with the BS so that BS can provide a relay service to MSs in frames having the configuration of FIG. 2. Because the RS provides the relay service using the same frame configuration as the BS, it has difficulty in concurrently communicating with the BS and the MSs over one frequency band in one frame. To avert a Radio Frequency (RF) isolation problem caused by the frame configuration illustrated in FIG. 2, the frames are configured as illustrated in FIG. 3 so that transmission to and reception from the RS occur in parallel in time.

FIG. 3 illustrates a TDD frame structure in a conventional multi-hop relay BWA communication system.

In FIG. 3, a DL subframe 300 is divided into a first area 301 and a second area 303, and a UL subframe 310 is divided into a first area 311 and a second area 313. For the RS operation transitions, the first areas 301 and 311 are distinguished from the second areas 311 and 313 in time division. The lengths of the first areas 301 and 311 and the lengths of the second areas 311 and 313 are fixed or adaptively adjusted according to a cell environment.

The BWA communication system provides a direct link service in the first areas 301 and 311 and a relay link service in the second areas 303 and 313. Hence, the BS provides a synchronization channel, a control channel, and a traffic channel to an MS connected to it by a direct link in the first areas 301 and 311 and a synchronization channel, a control channel, and a traffic channel to an RS in the second areas 303 and 313.

Since the RS may move as illustrated in FIG. 4, the BWA communication system should consider the mobility of the RS.

FIG. 4 illustrates movement of the RS in the conventional multi-hop relay BWA communication system.

In FIG. 4, being located in a vehicle such as a bus or a train, RS1 420 has mobility. Hence, the BWA communication system should provide a synchronization channel to RS1 420 for synchronization and cell search, taking into account its mobility.

In the case of the frame configuration illustrated in FIG. 3, the lengths of the first and second areas 301 and 303 of the DL subframe 300 may vary depending on a cell environment. The resulting change in the position of the synchronization channel at the start of the second area 303 imposes overhead because RS1 420 should locate the synchronization channels of the neighbor BSs. Increased interference between neighbor cells due to the power boost of synchronization channels, transmission of information about the neighbor BSs, and search for the synchronization channel of each neighbor BS add to the RS overhead.

Without providing the synchronization channels, RS2's 120 and 130, as illustrated in FIG. 1, provide the relay service in conjunction with the BS by multiple communications in the cell. In this case, an MS experiences near-far interference because of the power difference between a signal received from BS 100 or the RS1 110 and a signal received from the RS2 120 or 130, as illustrated in FIG. 5.

FIG. 5 illustrates a signal flow for a relay service from an RS in the conventional multi-hop relay BWA communication system.

In FIG. 5, within the cell area of a BS 500, a first MS 530 (MS1) in a good channel status receives a service from the BS 500 via a direct link and a second MS 520 (MS2) in a poor channel status receives the service via RS2 510.

Although BS 500 and RS2 510 perform multiple communications using orthogonal resources in the same time area, a BS link signal is overlaid with an RS link signal in the air. Thus, MS1 may undergo near-far interference as it receives a stronger interference signal from the nearby RS2 510 than a signal from BS 510. The near-far interference may also occur to the uplink as RS2 510 receives a stronger interference signal from MS1 than a signal from MS2.

SUMMARY OF THE INVENTION

An aspect of the present invention is to substantially solve at least the above problems and/or disadvantages and to provide at least the advantages below. Accordingly, one aspect of the present invention is to provide an apparatus and method for efficiently supporting cell search and synchronization according to the mobility of an RS in a multi-hop relay BWA communication system.

Another aspect of the present invention is to provide an apparatus and method for efficiently supporting cell search and synchronization according to the mobility of an RS by providing synchronization channels in a multi-hop relay BWA communication system.

A further aspect of the present invention is to provide an apparatus and method for reducing near-far interference caused by multiple communications within a cell in a multi-hop relay BWA communication system.

Still another aspect of the present invention is to provide an apparatus and method for eliminating near-far interference between relay communications and direct communications in a cell by time-multiplexing the relay communications and the direct communications in a multi-hop relay BWA communication system.

Yet another aspect of the present invention is to provide a method for configuring a frame so as to provide synchronization channels and eliminate near-far interference and an apparatus supporting the same in a multi-hop relay BWA communication system.

According to an aspect of the present invention, there is provided a method for configuring a subframe in order to support a relay service in a multi-hop relay (BWA) communication system. The method includes configuring at least one of a BS-MS link subframe, a primary RS-MS link subframe, and a BS-secondary RS link subframe is configured in a first period of the subframe, the BS-MS link subframe being a subframe for a link between a BS and an MS, the primary RS-MS link subframe being a subframe for a link between a primary RS that provides a synchronization channel; and configuring an MS, and the BS-secondary RS link subframe being a subframe for a link between the BS and a secondary RS that does not provide a synchronization channel, and at least one of a BS-primary RS link subframe, an RS-RS link subframe, and a secondary RS-MS link subframe is configured in a second period of the subframe, the BS-primary RS link subframe being a subframe for a link between the BS and the primary RS, an RS-RS link subframe being a subframe for a link between an RS and another RS, and a secondary RS-MS link subframe being a subframe for a link between the secondary RS and an MS.

According to another aspect of the present invention, there is provided a method for configuring a downlink subframe in order to support a relay service in a multi-hop relay (BWA) communication system. The method includes configuring a BS-MS link subframe and an RS-MS link subframe are provided in a first period of the downlink subframe, the BS-MS link subframe being a subframe for a link between a BS and an MS and the RS-MS link subframe being a subframe for a link between an RS and an MS; configuring a $1^{st}$ group RS-$2^{nd}$ group next-hop RS link subframe is configured in a second period of the downlink subframe, the $1^{st}$ group RS-$2^{nd}$ group next-hop RS link subframe being a subframe for a link between an RS of a first group including odd-hop RSs and a next-hop RS of a second group including even-hop RSs; and configuring a BS-1-hop RS link subframe and a $2^{nd}$ group RS-$1^{st}$ group next-hop RS link subframe are configured in a third period of the downlink subframe, the BS-1-hop RS link subframe being a subframe for a link between the BS and a 1-hop RS and the $2^{nd}$ group RS-$1^{st}$ group next-hop RS link subframe being a subframe for a link between an RS of the second group and a next-hop RS of the first group.

According to another aspect of the present invention, there is provided a method for configuring a downlink subframe in order to support a relay service in a multi-hop relay BWA communication system. The method includes configuring a BS-MS link subframe and an RS-MS link subframe are configured in a first period of the downlink subframe, the BS-MS link subframe being a subframe for a link between a BS and an MS and the RS-MS link subframe being a subframe for a link between an RS and an MS; configuring a BS-1-hop RS link subframe and a $2^{nd}$ group RS-$1^{st}$ group next-hop RS link subframe are configured in a second period of the downlink subframe, the BS-1-hop RS link subframe being a subframe for a link between the BS and a 1-hop RS and the $2^{nd}$ group RS-$1^{st}$ group next-hop RS link subframe being a subframe for a link between an RS of a second group including even-hop RSs and a next-hop RS of a first group including odd-hop RSs and configuring a $1^{st}$ group RS-$2^{nd}$ group next-hop RS link subframe is configured in a third period of the downlink subframe, the $1^{st}$ group RS-$2^{nd}$ group next-hop RS link subframe being a subframe for a link between an RS of the first group and a next-hop RS of the second group.

According to still another aspect of the present invention, there is provided a method for configuring an uplink subframe in a multi-hop relay BWA communication system. The method includes configuring an MS-BS link subframe and an MS-RS link subframe are configured in a first period of the uplink subframe, the MS-BS link subframe being a subframe for a link between an MS and a BS and the MS-RS link subframe being a subframe for a link between an MS and an RS; configuring a $2^{nd}$ group RS-$1^{st}$ group previous-hop RS link subframe is configured in a second period of the uplink subframe, the $2^{nd}$ group RS-$1^{st}$ group previous-hop RS link subframe being a subframe for a link between an RS of a second group including even-hop RSs and a previous-hop RS of a first group including odd-hop RSs; and configuring a 1-hop RS-BS link subframe and a $1^{st}$ group RS-$2^{nd}$ group previous-hop RS link subframe is configured in a third period of the uplink subframe, the 1-hop RS-BS link subframe being a subframe for a link between a 1-hop RS and the BS and the $1^{st}$ group RS-$2^{nd}$ group previous-hop RS link subframe being a subframe for a link between an RS of the first group and a previous-hop RS of the second group.

According to yet another aspect of the present invention, there is provided a method for configuring an uplink subframe in a multi-hop relay BWA communication system. The method includes configuring an MS-BS link subframe and an MS-RS link subframe are configured in a first period of the uplink subframe, the MS-BS link subframe being a subframe for a link between an MS and a BS and the MS-RS link subframe being a subframe for a link between an MS and an RS: configuring a 1-hop RS-BS link subframe and a $1^{st}$ group RS-$2^{nd}$ group previous-hop RS link subframe is configured in a second period of the uplink subframe, the 1-hop RS-BS link subframe being a subframe for a link between a 1-hop RS and the BS and the $1^{st}$ group RS-$2^{nd}$ group previous-hop RS link subframe being a subframe for a link between an RS of a first group including odd-hop RSs and a previous-hop RS of a second group including even-hop RSs; and configuring a $2^{nd}$ group RS-$1^{st}$ group previous-hop RS link subframe is configured in a third period of the uplink subframe, the $2^{nd}$ group RS-$1^{st}$ group previous-hop RS link subframe being a subframe for a link between an RS of the second group and a previous-hop RS of the first group.

According to yet another aspect of the present invention, there is provided a method of a BS in a multi-hop relay BWA communication system. The method includes the BS allocating resources to a first period and a second period of a subframe, the first period being for communicating with at least one of an MS and a secondary RS that does not provide a synchronization channel and the second period being for communicating with a primary RS that provides a synchronization channel; communicating with the at least one of the MS and the secondary RS in the first period of the subframe; and communicating with the primary RS in the second period of the subframe.

According to still another aspect of the present invention, there is provided a method of an RS that provides a synchronization channel in a multi-hop relay BWA communication system. The method includes the RS setting a first period and a second period according to control information received from an upper node, the first period being for communicating with an MS and the second period being for communicating with at least one of the upper node and a lower RS; communicating with the MS in the first period; and communicating with the at least one of the upper node and the lower RS in the second period.

According to still another aspect of the present invention, there is provided a method of an RS that does not provide a synchronization channel in a multi-hop relay BWA communication system. The method includes the RS setting a first period and a second period according to control information received from an upper node, the first period being for communicating with the upper node and the second period being for communicating with an MS; communicating with the upper node in the first period; and communicating with the MS in the second period.

According to still yet another aspect of the present invention, there is provided an apparatus of a BS in a multi-hop relay BWA communication system. The apparatus includes a timing controller for providing a timing signal for transmission and reception according to a subframe configuration in which a first period and a second period are defined, the first period being for communicating with at least one of an MS and a secondary RS that doest not provide a synchronization channel and the second period being for communicating with a primary RS that provides a synchronization channel; a transmitter for generating one of a first period signal and a second period signal according to the timing signal and transmits the generated signal; and a receiver for receiving one of the first period signal and the second period signal according to the timing signal and recovers the received signal.

According to still yet another aspect of the present invention, there is provided an apparatus of an RS that provides a synchronization channel in a multi-hop relay BWA communication system. The apparatus includes a timing controller for providing a timing signal for transmission and reception according to a subframe configuration in which a first period and a second period are defined, the first period being for communicating with at least one of an MS and a secondary RS that doest not provide a synchronization channel and the second period being for communicating with an upper node; a transmitter for generating one of a first period signal and a second period signal according to the timing signal and transmits the generated signal; and a receiver for receiving one of the first period signal and the second period signal according to the timing signal and recovers the received signal.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides a technique for providing a synchronization channel to support the mobility of an RS and eliminating near-far interference caused by multiple communications within a cell in a multi-hop relay BWA communication system. The following description will be made in the context of a Time Division Duplex (TDD)-Orthogonal Frequency Division Multiple Access (OFDM) wireless communication system, while the present invention is also applicable to a communication system using any other multiple access scheme or any other division duplex scheme.

The term "primary RS" or "RS1" is defined as an RS that expands cell coverage and the term "secondary RS" or "RS2" is defined as an RS that increases capacity. Therefore, the RS1 provides a synchronization channel, a control channel, and traffic channels to the MSs or the RSs outside the cell area of a BS, whereas the RS2 provides unicast control and traffic channels to the MSs in a poor channel status though located in the cell area of the BS.

While it is described herein that a subframe is configured in compliance with the IEEE 802.16 standard for communications between a BS and an RS, it is obviously to be understood that an advanced technology with novel functionalities and usages is also applicable. The same holds true for communications with an upper RS (or superordinated RS) and a lower RS.

Figure 1:
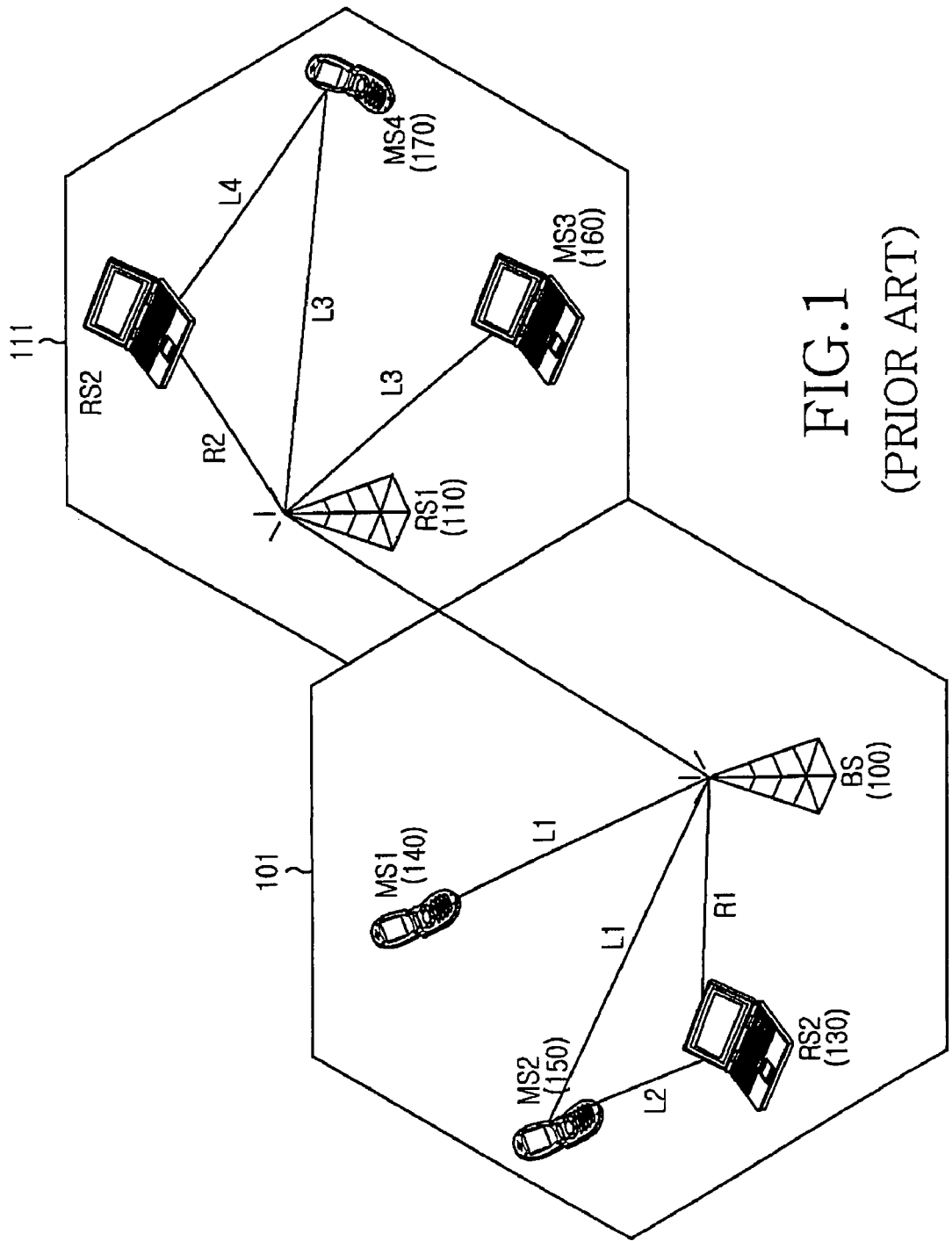
FIG. 1 illustrates a signal flow for a relay service in a typical multi-hop relay BWA communication system.
Figure 2:
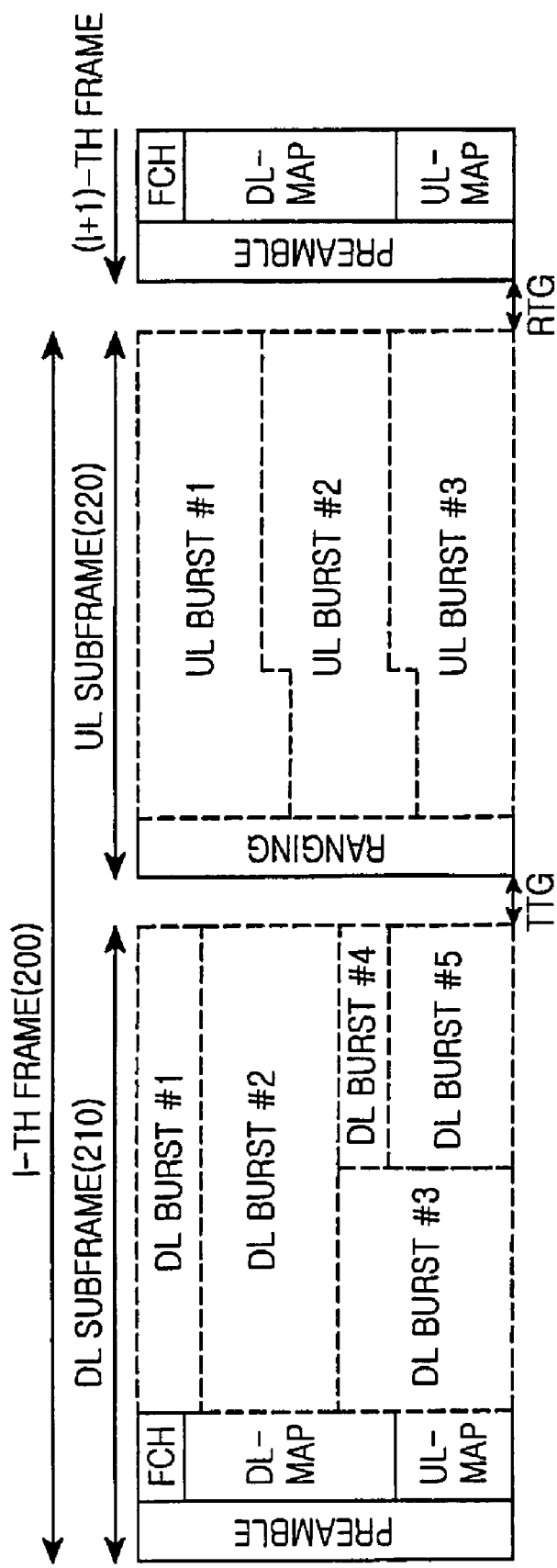
FIG. 2 illustrates a frame structure in a typical IEEE 802.16 system.
Figure 3:
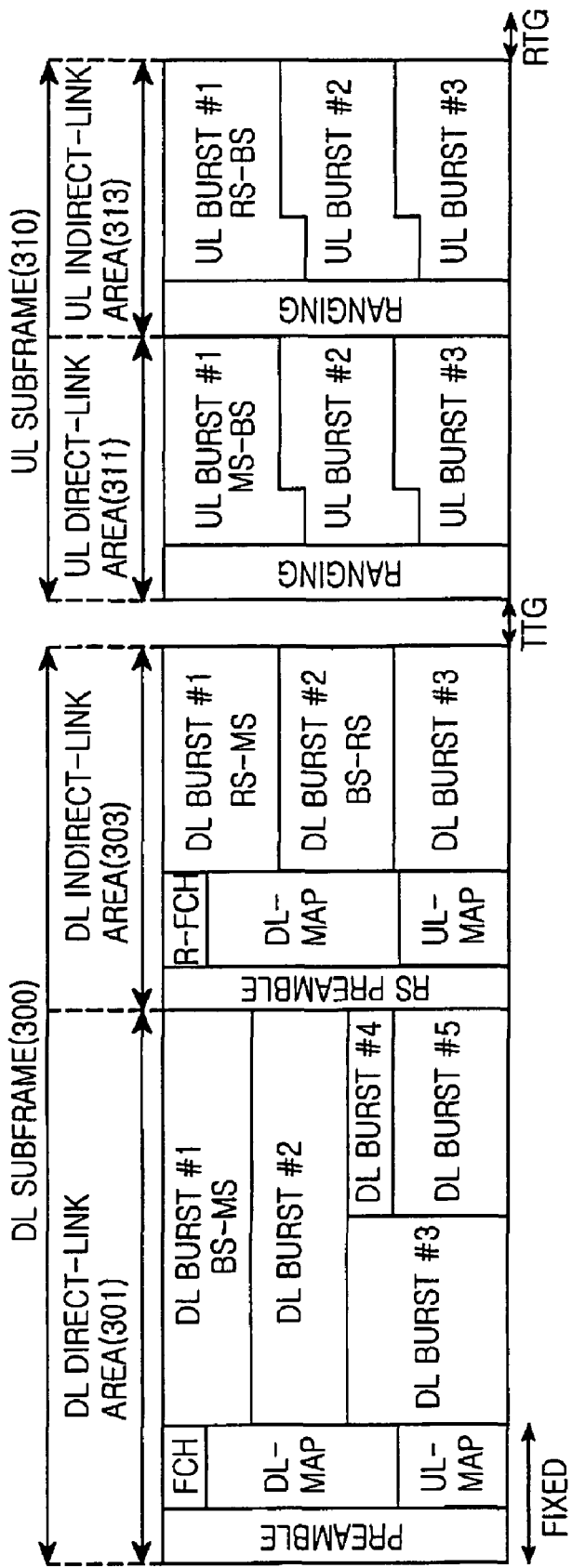
FIG. 3 illustrates a frame structure in a conventional multi-hop relay BWA communication system.
Figure 4:
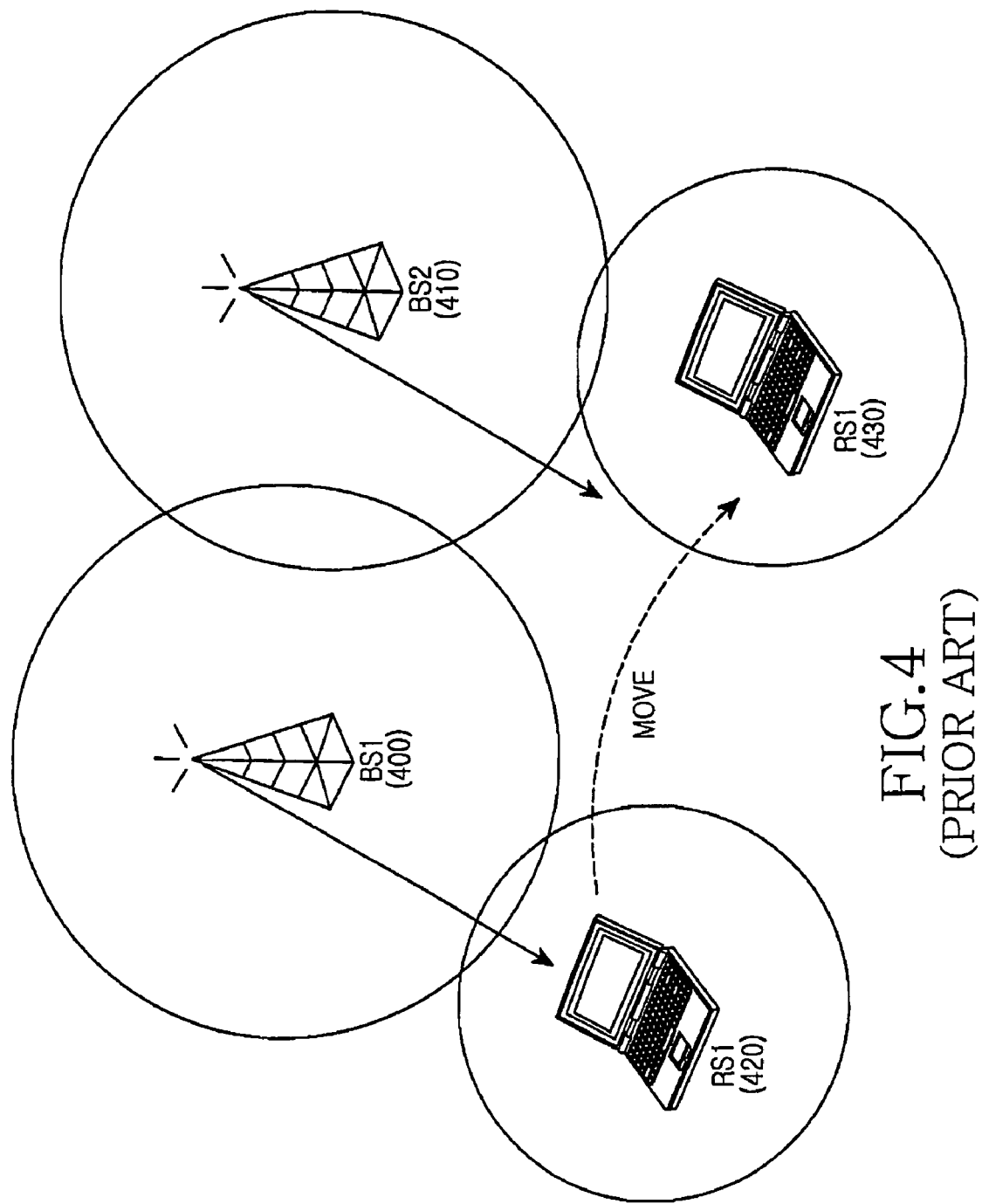
FIG. 4 illustrates an RS movement in the conventional multi-hop relay BWA communication system.
Figure 5:
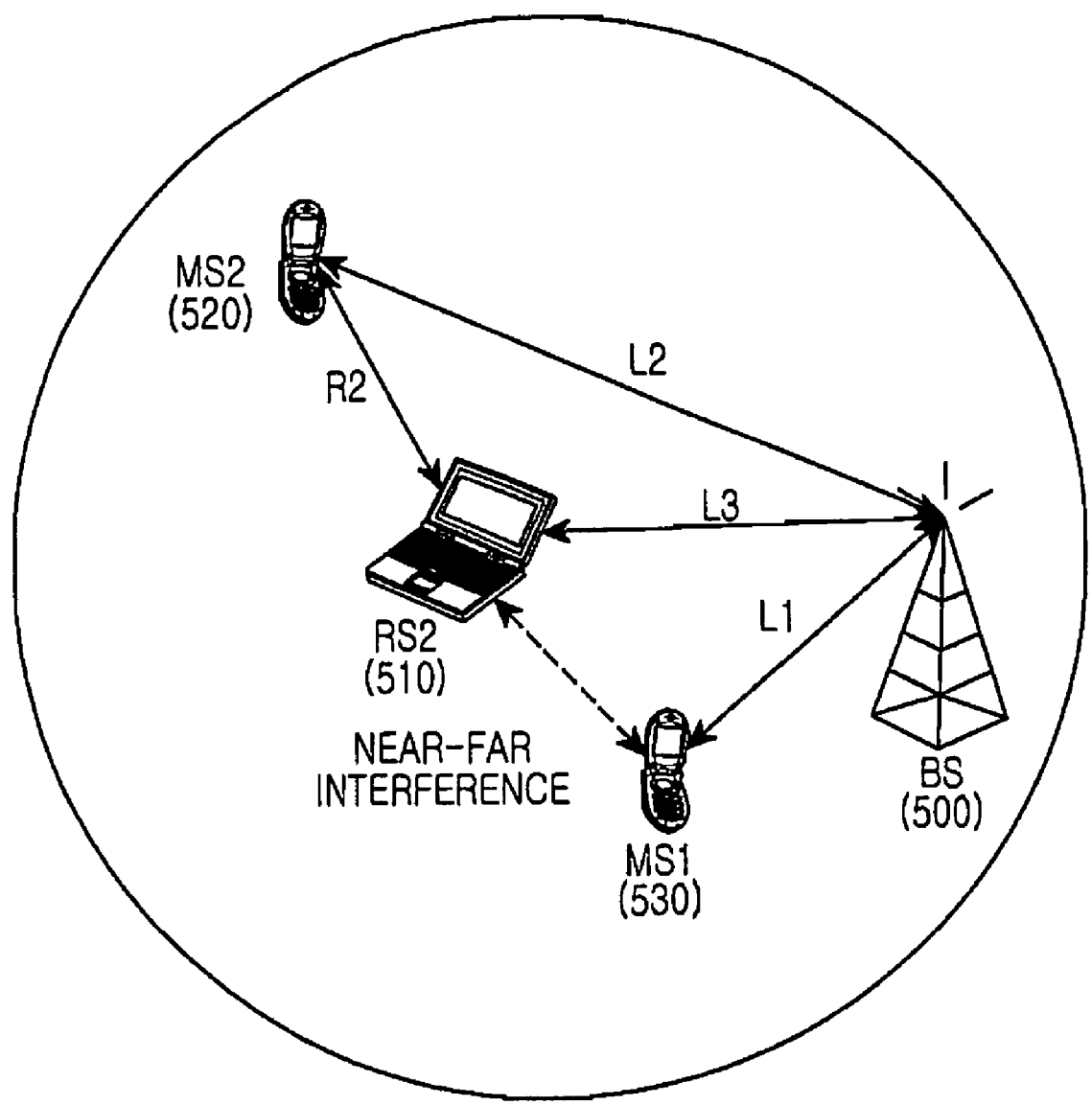
FIG. 5 illustrates a signal flow for a relay service from an RS in the conventional multi-hop relay BWA communication system.
Figure 6:
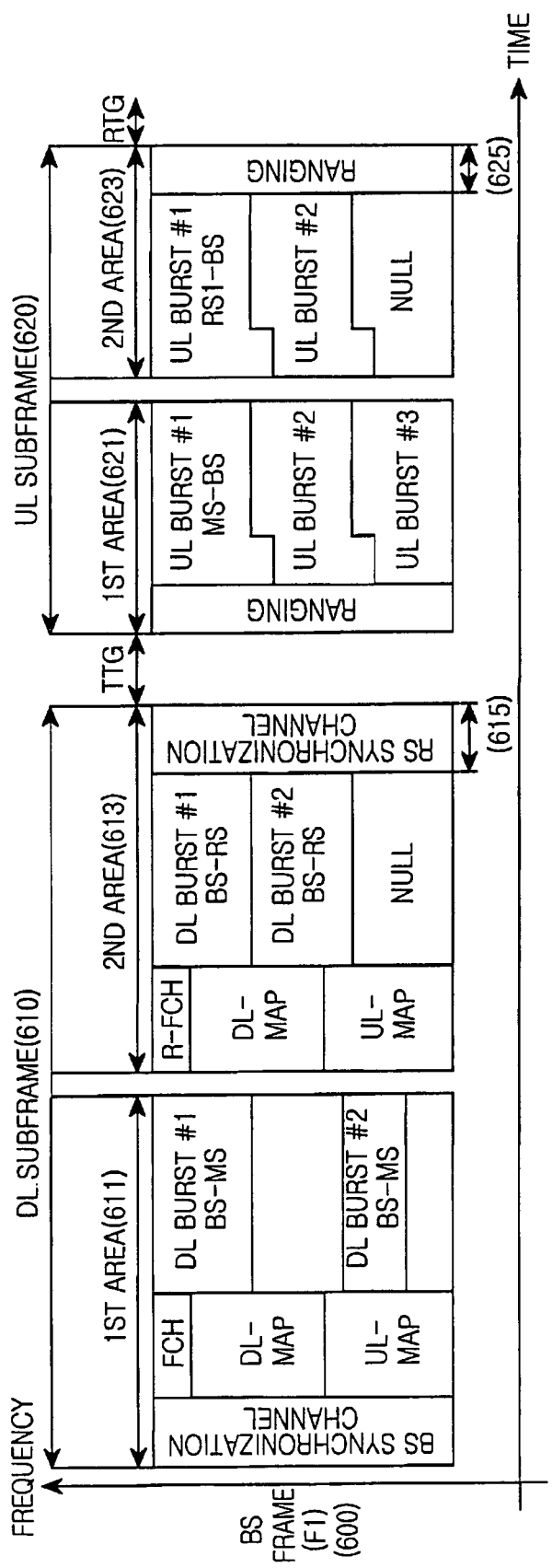
FIG. 6 illustrates a frame structure with synchronization channels in a multi-hop relay BWA communication system according to the present invention.

FIG. 6 illustrates a frame structure that provides synchronization channels to the MSs and the RSs in a multi-hop relay BWA communication system according to the present invention.

In FIG. 6, a frame is composed of a DL subframe 610 and a UL subframe 620. The DL subframe 610 includes time-multiplexed first and second areas 611 and 613, and the UL subframe 620 includes time-multiplexed first and second areas 621 and 623. The lengths of the first areas 611 and 621 and the lengths of the second areas 621 and 623 may be fixed or vary depending on a cell environment.

A BS communicates with an MS connected to it via a direct link in the first areas 611 and 621, and communicates with an RS in the second areas 613 and 623. As the lengths of the first areas 611 and 621 and the second areas 613 and 623 may vary dynamically according to the cell environment as mentioned above, the BS allocates synchronization channels at the start of the first area 611 and at the end of the second area 613 so that the MS and the RS can acquire synchronization. The BS also allocates ranging channels at the start of the first area 621 and the end of the second area 623, for ranging from MSs. The positions of the ranging channels (or ranging slots) in the UL subframe 620 may be indicated by a control channel rather than they are fixed.

To facilitate synchronization and cell search, the BS provides the MS with a synchronization channel (referred to as BS synchronization channel) in the form of a preamble and the RS with a synchronization channel (referred to as RS synchronization channel) in the form of a postamble. As the synchronization channels reside at the start and end of the DL subframe 610, the MS and the RS can acquire synchronization information and neighbor BS information from the fixed synchronization channels. The RS synchronization channel can further be used for interference measurement.

Multiple communications take place among the BS, RS1, RS2 and MSs in the multi-hop relay BWA communication system.

Since the BS and RS2 provide a service to the MSs within the service area of the BS, they use orthogonal resources to avoid interference between two links, i.e. a BS-MS link and an RS2-MS link. When a plurality of RS2's exist in the cell, the orthogonal resources allocated to the RS2 can be reused among them by spatial multiplexing.

Therefore, the BS-MS link signal is distinguished from the RS2-MS link signal in the frequency domain, but they overlap each other in the time domain. When the BS and RS2 communicate with the MSs at the same time, near-far interference occurs.

Figure 7:
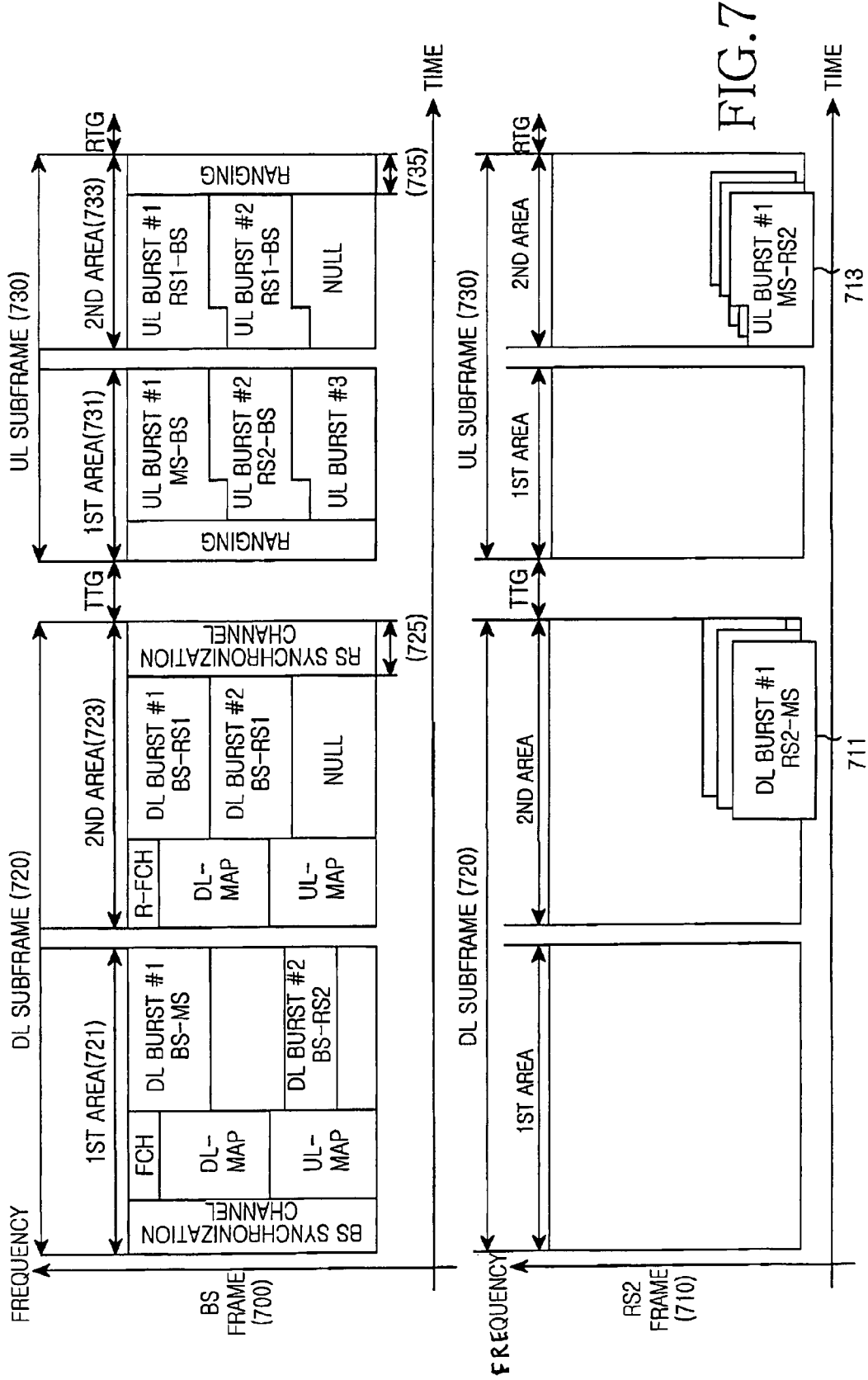
FIG. 7 illustrates a frame structure in the multi-hop relay BWA communication system according to the present invention.

In this context, the same time resources are not allocated to the BS-MS link and the RS2-MS link as illustrated in FIG. 7. Specifically, the BWA communication system allocates predetermined resources of the second areas 613 and 623 to the RS2-MS link.

FIG. 7 illustrates a frame structure in the multi-hop relay BWA communication system according to the present invention. According to the frame structure, a frame is so configured that resources are allocated to the RS1 and the RS2 in frequency division.

In FIG. 7, each frame is composed of a DL subframe 720 and a UL subframe 730. The DL subframe 720 includes a time-multiplexed first and second areas 721 and 723, and the UL subframe 730 includes time-multiplexed first and second areas 731 and 733. The lengths of the first areas 721 and 731 and the lengths of the second areas 723 and 733 are fixed or dynamically vary depending on a cell environment.

In an RS2 frame 710, the RS2 communicates with the BS in the first areas 721 and 731 and communicates with an MS in predetermined parts 711 and 713 of the second areas 723 and 733. If a plurality of RS2's exist, the second areas 723 and 733 are reused among them by spatial division multiplexing. The RS1 provides a transparent relay service to an MS in the first areas 721 and 731 and communicates with the BS in the second areas 723 and 733.

Figure 8:
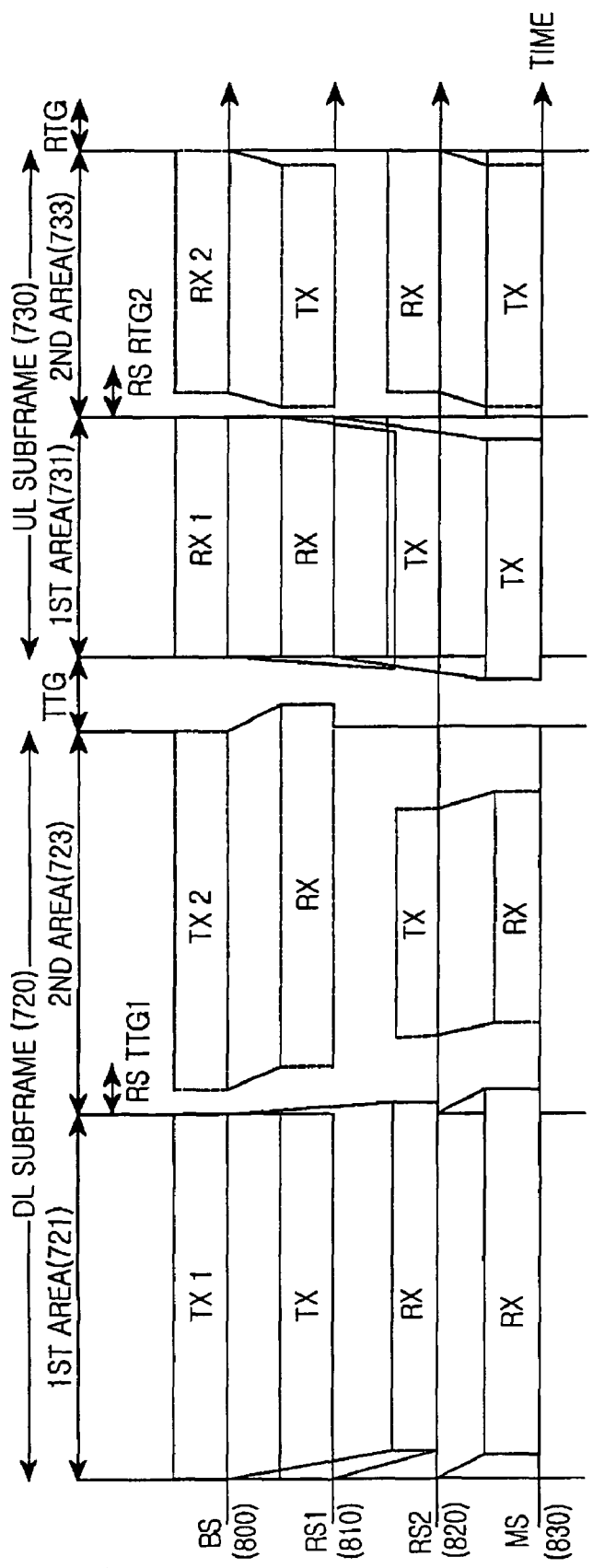
FIG. 8 is a diagram illustrating the transmission and reception timings of signals in accordance with the frame structure illustrated in FIG. 7.

When a frame is configured by the spatial multiplexing and the time multiplexing as described above, the transmission and reception of the BS, RS1, RS2, and the MSs are in the relationship illustrated in FIG. 8.

FIG. 8 is a diagram illustrating the transmission and reception timings of signals in accordance with the frame structure illustrated in FIG. 7.

In FIG. 8, in the DL subframe 720, a BS 800 sends a synchronization channel, a control channel, and a traffic burst to an RS2 820 or an MS 830 connected to the BS 800 via a direct link in the first area 721 and then sends a control channel, a traffic burst, and a synchronization channel to an RS1 810 in the second area 723. The BS 800 provides the MS 830 and the RSs 810 and 820 with a BS synchronization channel and an RS synchronization channel at the start of the first area 721 and at the end of the second area 723, respectively.

The RS1 810 sends a synchronization channel, a control channel, and a traffic burst to the RS2 820 or the MS 830 connected to the RS1 810 via a relay link in the first area 721. Then, the RS1 810 receives the synchronization channel, the control channel, and the traffic burst from the BS 800 in the second area 723.

The RS2 820 receives the control channel and the traffic burst needed for the relay service from the BS 800 in the first area 721. Then, the RS2 820 sends the traffic burst to the MS 830 connected to the RS2 via a relay link in the predetermined part 711 of the second area 723.

The MS 830 receives the synchronization channel, the control channel, and the traffic burst from the BS 800 or the RS1 810 in the first area 721. Then, the MS 830 receives a signal from the RS1 810 or the RS2 820 in the second area 723. Particularly, the MS 830 receives the traffic burst from RS2 820 in the part of the second area 723.

To avoid near-far interference, the second areas 723 and 733 are allocated to a RS2-MS link and a BS-RS1 link by frequency division. In another embodiment of the present invention, the second areas 723 and 733 are allocated to the RS2-MS link and the BS-RS1 link by time division.

Figure 9:
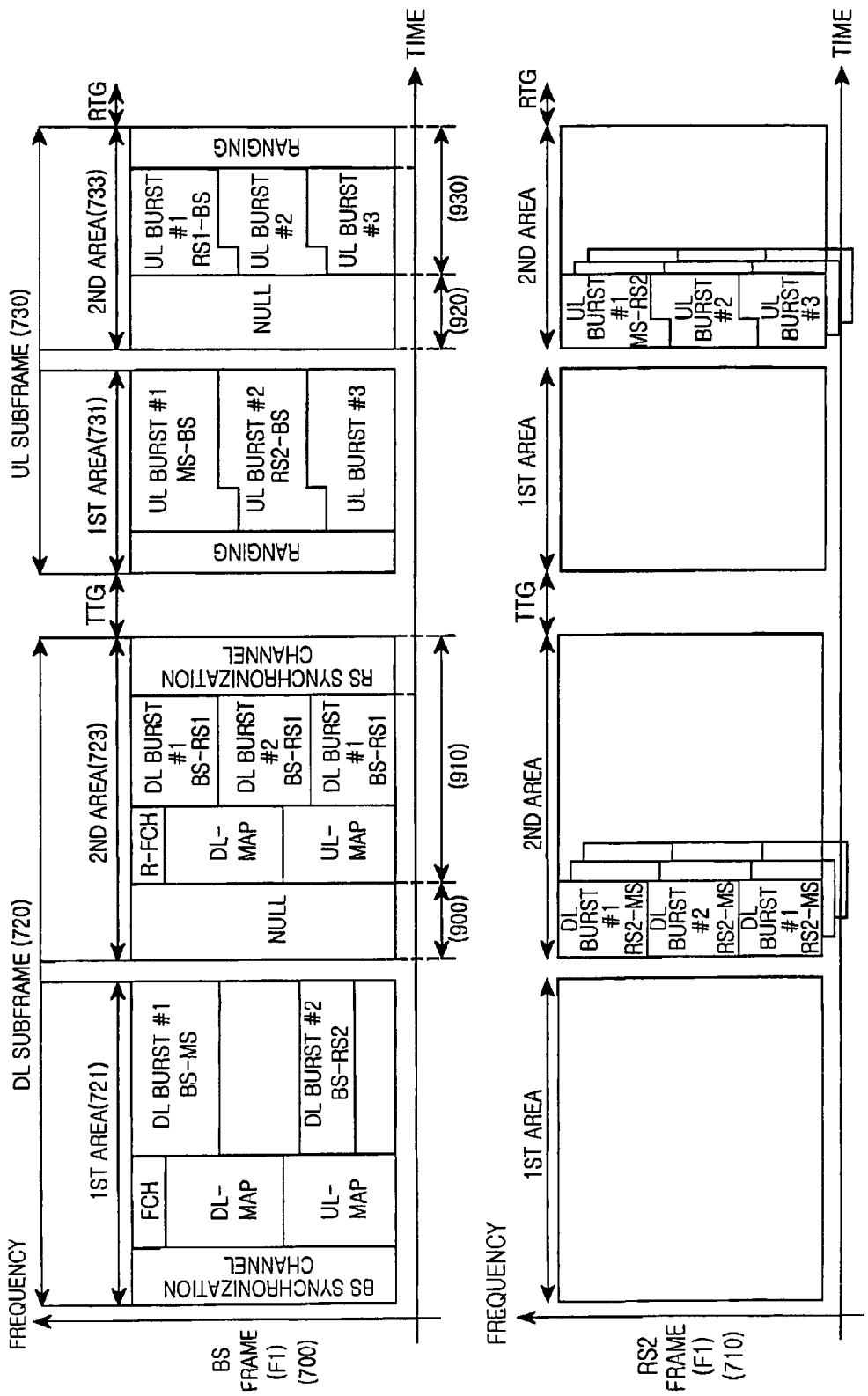
FIG. 9 illustrates a frame structure in the multi-hop relay BWA communication system according to the present invention.

FIG. 9 illustrates a frame structure in the multi-hop relay BWA communication system according to the present invention. A BS frame 700 and an RS2 frame 710 are shown.

In FIG. 9, each of the frames 700 and 710 is composed of the DL subframe 720 and the UL subframe 730. The DL subframe 720 includes the time-multiplexed first and second areas 721 and 723, and the UL subframe 730 includes the time-multiplexed first and second areas 731 and 733. The second areas 723 and 733 are divided into the RS2-MS areas 900 and 920 and BS-RS1 areas 910 and 930. The BS provides the RS1 with an RS synchronization channel taking the form of a postamble at a fixed position. Therefore, the RS2-MS areas 900 and 920 precede the BS-RS1 areas 910 and 930 in the second areas 723 and 733.

The BS communicates with the RS2 or an MS in the first areas 721 and 731 and communicates with RS1 in the second areas 723 and 733. Notably, the BS leaves the RS2-MS areas 900 and 920 empty in the second areas 723 and 733 to avoid intra-cell interference. Accordingly, the BS communicates with RS1 in the BS-RS1 areas 910 and 930.

For RS1, the BS provides the RS synchronization channel and a ranging channel at the ends of the BS-RS1 areas 910 and 930.

In the RS frame 710, RS2 communicates with the BS in the first areas 721 and 731 and then communicates with an MS in the RS2-MS areas 900 and 920 of the second areas 723 and 733. Notably, the RS2 does not use the BS-RS1 areas 910 and 930 to avoid the intra-cell interference.

The above description has been made in the context of a two-hop multi-hop relay BWA communication system. The BWA communication system may be configured so that an MS communicates with a BS over multiple hops, as illustrated in FIG. 10.

Figure 10:
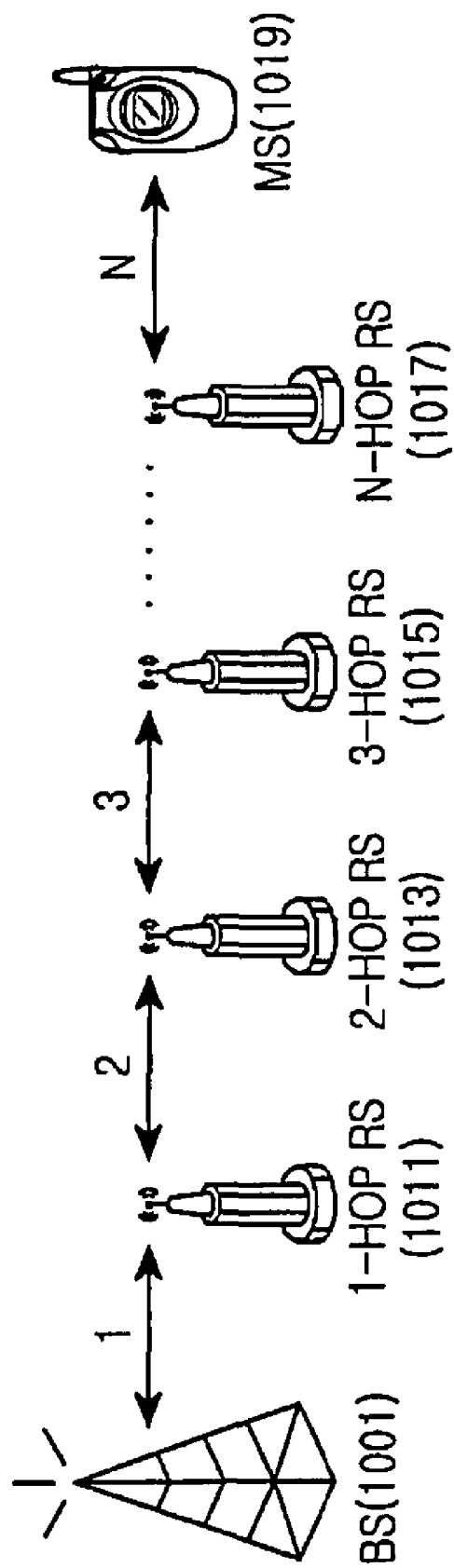
FIG. 10 illustrates a configuration of the multi-hop relay BWA communication system according to the present invention.

FIG. 10 illustrates a configuration of the multi-hop relay BWA communication system according to the present invention.

In FIG. 10, a BS 1001 communicates with an MS 1019 via relay links established by a plurality of RSs 1011, 1013, 1015, and 1017.

The RSs 1011, 1013, 1015, and 1017 can be grouped into a $1^{st}$ group and a $2^{nd}$ group. For example, if the BS 1001 is set as a 0-hop RS, the $1^{st}$ group is an even-hop group including the BS 1001, a 2-hop RS 1013, a 4-hop RS, and other even-hop RSs and the $2^{nd}$ group is an odd-hop group including a 1-hop RS 1011, a 3-hop RS 1015, and other odd-hop RSs.

If the BS 1001 is not classified as the 0-hop RS, the $1^{st}$ group is an odd-hop group including the 1-hop RS 1011, the 3-hop RS 1015, and other odd-hop RSs and the $2^{nd}$ group is an even-hop group including the 2-hop RS 1013, the 4-hop RS, and the other even-hop RSs.

When the multi-hop links are grouped into the first and second groups in this way, communications are carried out in frames having the configurations illustrated in FIGS. 11 to 16 in the BWA communication system. The following description is made on the assumption that the $1^{st}$ group is the odd-hop group and the second area illustrated in FIG. 6 is further divided into second and third areas.

Figure 11:
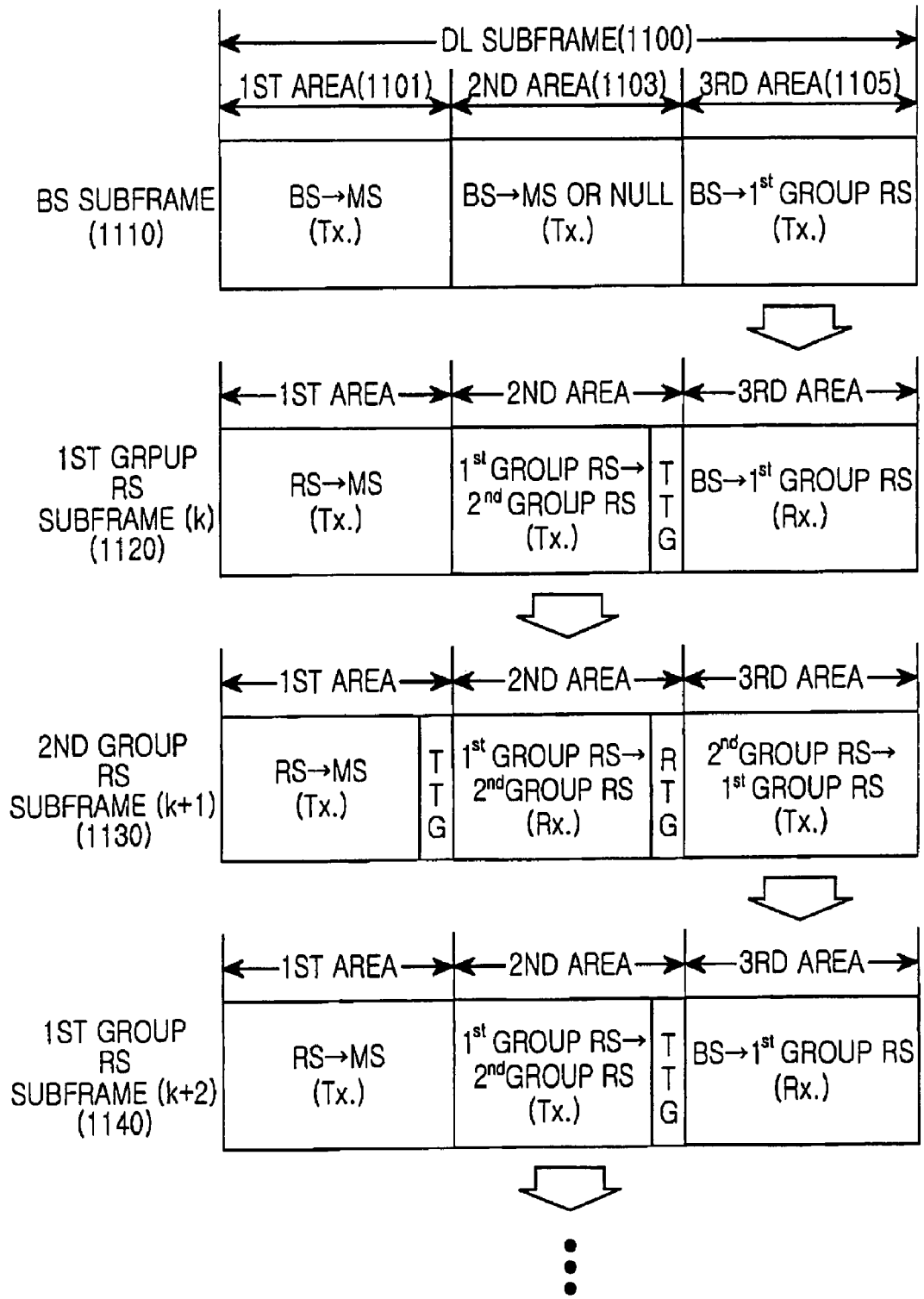
FIG. 11 illustrates a DL subframe structure in the multi-hop relay BWA communication system according to the present invention.
Figure 13:
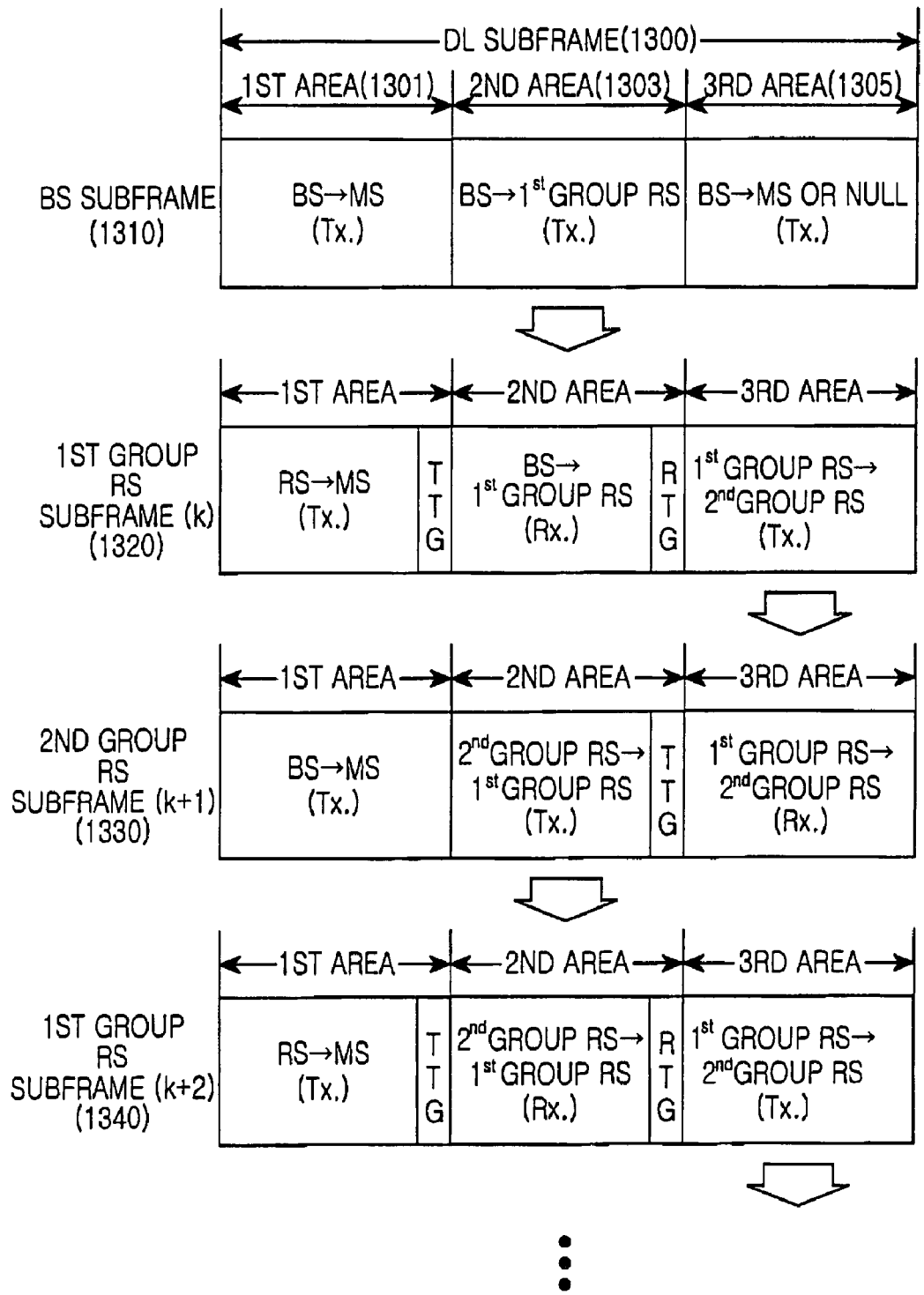
FIG. 13 illustrates a DL subframe structure in the multi-hop relay BWA communication system according to the present invention.

A DL subframe has the configuration illustrated in FIG. 11 or FIG. 13 in the BWA communication system.

FIG. 11 illustrates a DL subframe structure in the multi-hop relay BWA communication system according to the present invention.

Referring to FIG. 11, each DL subframe 1100 includes a time-multiplexed first, second, and third areas 1101, 1103, and 1105, respectively.

In a BS subframe 1110, the BS sends the downlink subframes to an MS within its service area in the first and second areas 1101 and 1103. To avoid interference between the MS and an RS, null data can be filled in the second area 1103, instead of the downlink subframe. The BS provides the MS with a preamble as a synchronization channel at the start of the first area 1101. The BS sends a downlink subframe to a 1-hop RS of the $1^{st}$ group in the third area 1105. The BS provides the 1-hop RS with a postamble as a synchronization channel at the end of the third area 1105.

In a $1^{st}$ group RS subframe 1120, a $1^{st}$ group RS sends a downlink subframe to an MS within its service area in the first area 1101. The $1^{st}$ group RS provides the MS with a synchronization channel in the form of a preamble at the start of the first area 1101. The $1^{st}$ group RS sends a downlink subframe to a next-hop RS of the $2^{nd}$ group in the second area 1103. The $1^{st}$ group RS provides the next-hop RS with a synchronization channel in the form of a postamble at the end of the second area 1103. The $1^{st}$ group RS receives a downlink subframe from a previous-hop RS of the $2^{nd}$ group in the third area 1105. If the $1^{st}$ group RS is the 1-hop RS, the $1^{st}$ group RS receives the downlink subframe from the BS in the third area 1105. A TTG is interposed between the second area 1103 and the third area 1105, for an operation transition of the $1^{st}$ group RS. Hence, the $1^{st}$ group RS sends the synchronization channel to the $2^{nd}$ group RS using resources of the second area 1103 before the TTG In a $2^{nd}$ group RS subframe 1130, a $2^{nd}$ group RS sends a downlink subframe to an MS within its service area in the first area 1101. The $2^{nd}$ group RS provides the MS with a synchronization channel in the form of a preamble at the start of the first area 1101. The $2^{nd}$ group RS receives a downlink subframe from a previous-hop RS of the $1^{st}$ group in the second area 1103. The $2^{nd}$ group RS sends a downlink subframe to a next-hop RS of the $1^{st}$ group in the third area 1105. The $2^{nd}$ group RS provides the next-hop RS with a synchronization channel in the form of a postamble at the end of the third area 1105. For operation transitions of the $2^{nd}$ group RS, a TTG is interposed between the first area 1101 and the second area and an RTG intervenes between the second area 1103 and the third area 1105.

While not shown, if the $1^{st}$ group RS is a last-hop RS, the $1^{st}$ group RS sends the downlink subframes to the MSs within its service area in the first and second areas 1101 and 1103. To avoid interference between the MSs and the RS, the second area 1103 may have null data. Then, the last-hop RS receives a downlink subframe from a previous-hop RS of the $2^{nd}$ group in the third area 1105.

If the last-hop RS is a $2^{nd}$ group RS, the $1^{st}$ group RS sends the downlink subframes to the MSs within its service area in the first and third areas 1101 and 1105. To avoid interference between the MSs and the RS, the third area 1105 may have null data. The last-hop RS receives a downlink subframe from a previous-hop RS of the $1^{st}$ group in the second area 1103.

Figure 12:
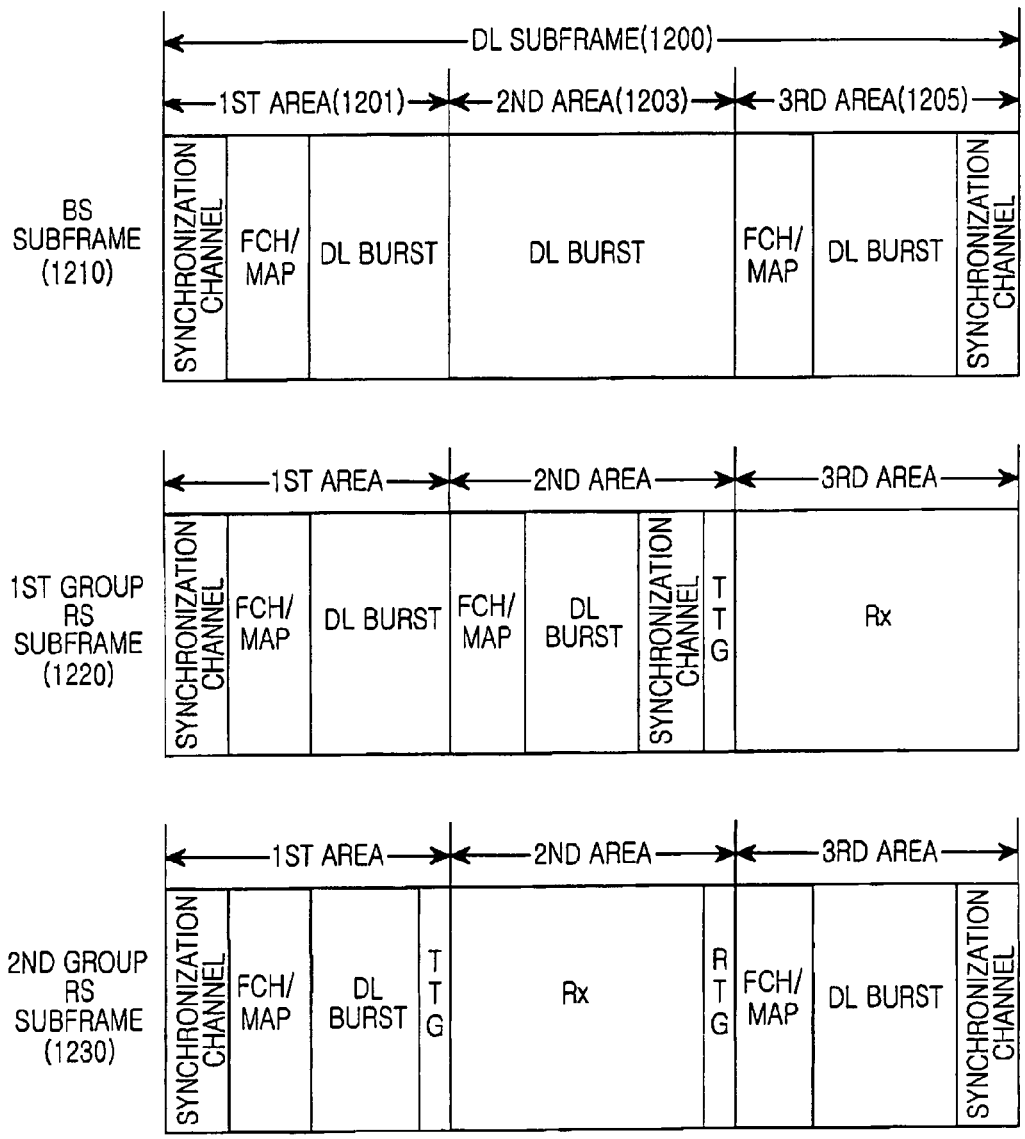
FIG. 12 illustrates the positions of synchronization channels in the DL subframe illustrated in FIG. 11 in the multi-hop relay BWA communication system according to the present invention.

In accordance with the DL frame structure illustrated in FIG. 11, the subframes of the first, second, and third areas of the DL subframe can be configured in compliance with IEEE 802.16 standards, as illustrated in FIG. 12.

FIG. 12 illustrates the positions of synchronization channels in the DL subframe illustrated in FIG. 11 in the multi-hop relay BWA communication system according to the present invention.

In FIG. 12, a DL subframe 1200 includes time-multiplexed first, second, and third areas 1201, 1203, and 1205, respectively.

A BS subframe 1210 carries a synchronization channel, a control channel, and a DL burst to an MS within the service area of the BS. The BS positions the synchronization channel for the MS in the form of a preamble at the start of the first area 1201. If the BS uses the second area 1203, the BS frame 1210 includes a DL burst in the second area 1203. The third area 1205 has a control channel, a DL burst, and a synchronization channel for the 1-hop RS. Thus, the BS provides the 1-hop RS with the synchronization channel in the form of a postamble at the end of the third area 1205.

In a $1^{st}$ group RS subframe 1220, the first area 1201 carries a synchronization channel, a control channel, and a DL burst to an MS within the service area of the $1^{st}$ group RS. The $1^{st}$ group RS provides the MS with the synchronization channel in the form of a preamble at the start of the first area 1201. The second area 1203 has a control channel, a DL burst, and a synchronization channel for the next-hop RS of the $2^{nd}$ group. Thus, the $1^{st}$ group RS provides the next-hop RS with the synchronization channel in the form of a postamble at the end of the second area 1203. The $1^{st}$ group RS receives a downlink subframe from a previous-hop RS or the BS in the third area 1205.

In a $2^{nd}$ group RS frame 1230, the first area 1201 includes a synchronization channel, a control channel, and a DL burst for an MS within the service area of the $2^{nd}$ group RS. That is, the $2^{nd}$ group RS provides the synchronization channel for the MS in the form of a preamble at the start of the first area 1201. The third area 1205 carries a synchronization channel, a control channel, and a DL burst for a next-hop RS of the $1^{st}$ group. That is, the $2^{nd}$ group RS provides the next-hop $1^{st}$ group RS with a synchronization channel in the form of a postamble at the end of the third area 1205. The $2^{nd}$ group RS receive a downlink subframe from a previous-hop RS in the second area 1203.

FIG. 13 illustrates a DL subframe structure in the multi-hop relay BWA communication system according to the present invention.

In FIG. 13, each DL subframe 1300 includes a time-multiplexed first, second, and third areas 1301, 1303, and 1305.

In a BS subframe 1310, the BS sends the downlink subframes to the MSs within its service area in the first and third areas 1301 and 1305. To avoid interference between the MSs and an RS, null data can be filled in the third area 1305, instead of the downlink subframe. The BS provides a preamble as a synchronization channel at the start of the first area 1301, for the MSs. The BS sends a downlink subframe to a 1-hop RS of the $1^{st}$ group in the second area 1303. The BS provides the 1-hop RS with a postamble as a synchronization channel at the end of the second area 1303. Since an RTG exists between the second area 1303 and the third area 1305 in a $1^{st}$ group RS subframe 1320, the BS sends the synchronization channel to the 1-hop RS before the RTG in the second area 1303.

In the $1^{st}$ group RS subframe 1320, a $1^{st}$ group RS sends a downlink subframe to an MS within its service area in the first area 1301. The $1^{st}$ group RS provides the MS with a synchronization channel in the form of a preamble at the start of the first area 1301. The $1^{st}$ group RS receives a downlink subframe from a previous-hop RS of the $2^{nd}$ group in the second area 1303. If the $1^{st}$ group RS is the 1-hop RS, the $1^{st}$ group RS receives the downlink subframe from the BS in the second area 1303. The 1$^{st}$ group RS sends a downlink subframe to a next-hop RS of the 2$^{nd}$ group in the third area 1305. The 1$^{st}$ group RS provides the next-hop RS with a synchronization channel in the form of a postamble at the end of the third area 1305. For operation transitions of the 1$^{st}$ group RS, a TTG is interposed between the first area 1301 and the second area 1303 and an RTG exists between the second area 1303 and the third area 1305 in the 1$^{st}$ group RS subframe 1320.

In a 2$^{nd}$ group RS subframe 1330, a 2$^{nd}$ group RS sends a downlink subframe to an MS within its service area in the first area 1301. The 2$^{nd}$ group RS provides the MS with a synchronization channel in the form of a preamble at the start of the first area 1301. The 2$^{nd}$ group RS sends a downlink subframe to a next-hop RS of the 1$^{st}$ group in the second area 1303. The 2$^{nd}$ group RS provides the next-hop RS with a synchronization channel in the form of a postamble at the end of the second area 1303. The 2$^{nd}$ group RS receives a downlink subframe from a previous-hop RS of the 1$^{st}$ group in the third area 1305.

While not shown, if a last-hop RS belongs to the 1$^{st}$ group, the last-hop RS sends the downlink subframes to the MSs within its service area in the first and third areas 1301 and 1305. To avoid interference between the MSs and the RS, the third area 1305 may have null data. The last-hop RS receives a downlink subframe from a previous-hop RS of the 2$^{nd}$ group in the second area 1303.

If the last-hop RS is a 2$^{nd}$ group RS, the last-hop RS sends the downlink subframes to the MSs within its service area in the first and second areas 1301 and 1303. To avoid interference between the MSs and the RS, the second area 1303 may have null data. The last-hop RS receives a downlink subframe from a previous-hop RS of the 1$^{st}$ group in the third area 1305.

Figure 14:
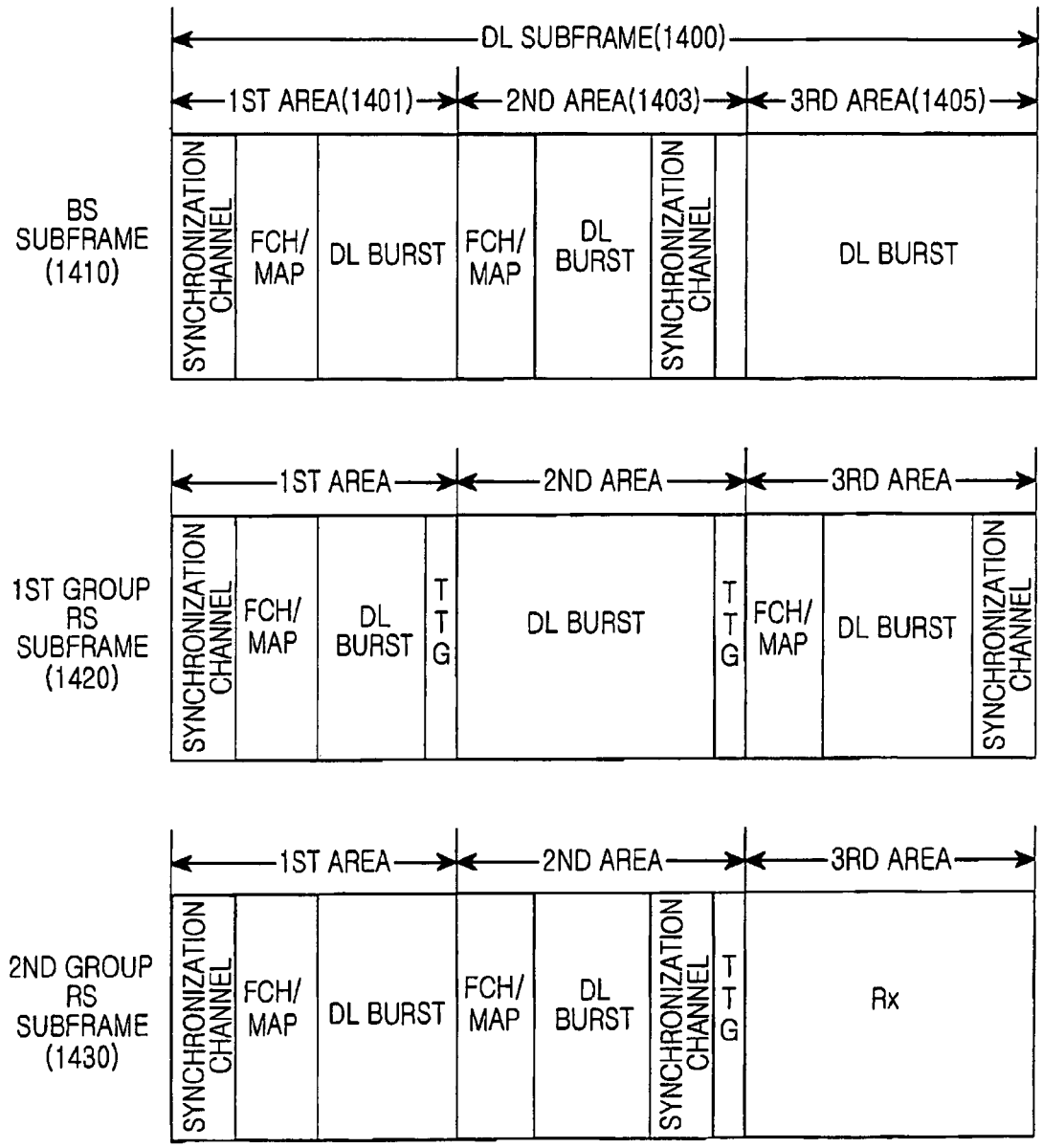
FIG. 14 illustrates the positions of synchronization channels in the DL subframe illustrated in FIG. 13 in the multi-hop relay BWA communication system according to the present invention.

In accordance with the DL frame structure illustrated in FIG. 13, the subframes of the first, second and third areas in the DL subframe can configured in compliance with IEEE 802.16 standards, as illustrated in FIG. 14.

FIG. 14 illustrates the positions of synchronization channels in the DL subframe illustrated in FIG. 13 in the multi-hop relay BWA communication system according to the present invention In FIG. 14, a DL subframe 1400 includes a time-multiplexed first, second, and third areas 1401, 1403, and 1405.

A BS subframe 1410 carries a synchronization channel, a control channel, and a DL burst to an MS within the service area of the BS. That is, the BS positions the synchronization channel for the MS in the form of a preamble at the start of the first area 1401. If the BS uses the third area 1405, the BS subframe 1410 includes a downlink burst in the third area 1405. The second area 1403 of the BS subframe 1410 has a control channel, a DL burst, and a synchronization channel for the 1-hop RS. Thus, the BS provides the 1-hop RS with the synchronization channel in the form of a postamble at the end of the second area 1403.

In a 1$^{st}$ group RS subframe 1420, the first area 1401 carries a synchronization channel, a control channel, and a DL burst to an MS within the service area of the 1$^{st}$ group RS. The 1$^{st}$ group RS provides the MS with the synchronization channel in the form of a preamble at the start of the first area 1401. The third area 1405 has a control channel, a DL burst, and a synchronization channel for the next-hop RS of the 2$^{nd}$ group. Thus, the 1$^{st}$ group RS provides the next-hop RS with the synchronization channel in the form of a postamble at the end of the third area 1405. The 1$^{st}$ group RS receives a downlink subframe from a previous-hop RS or the BS in the second area 1403.

In a 2$^{nd}$ group RS subframe 1430, the first area 1401 includes a synchronization channel, a control channel, and a DL burst for an MS within the service area of the 2$^{nd}$ group RS. That is, the 2$^{nd}$ group RS provides the synchronization channel to the MS in the form of a preamble at the start of the first area 1401. The second area 1403 carries a synchronization channel, a control channel, and a DL burst for a next-hop RS of the 1$^{st}$ group. The 2$^{nd}$ group RS provides the synchronization channel to the next-hop 1$^{st}$ group RS in the form of a postamble at the end of the second area 1403. The 2$^{nd}$ group RS receive a downlink subframe from a previous-hop RS in the third area 1405.

Figure 15:
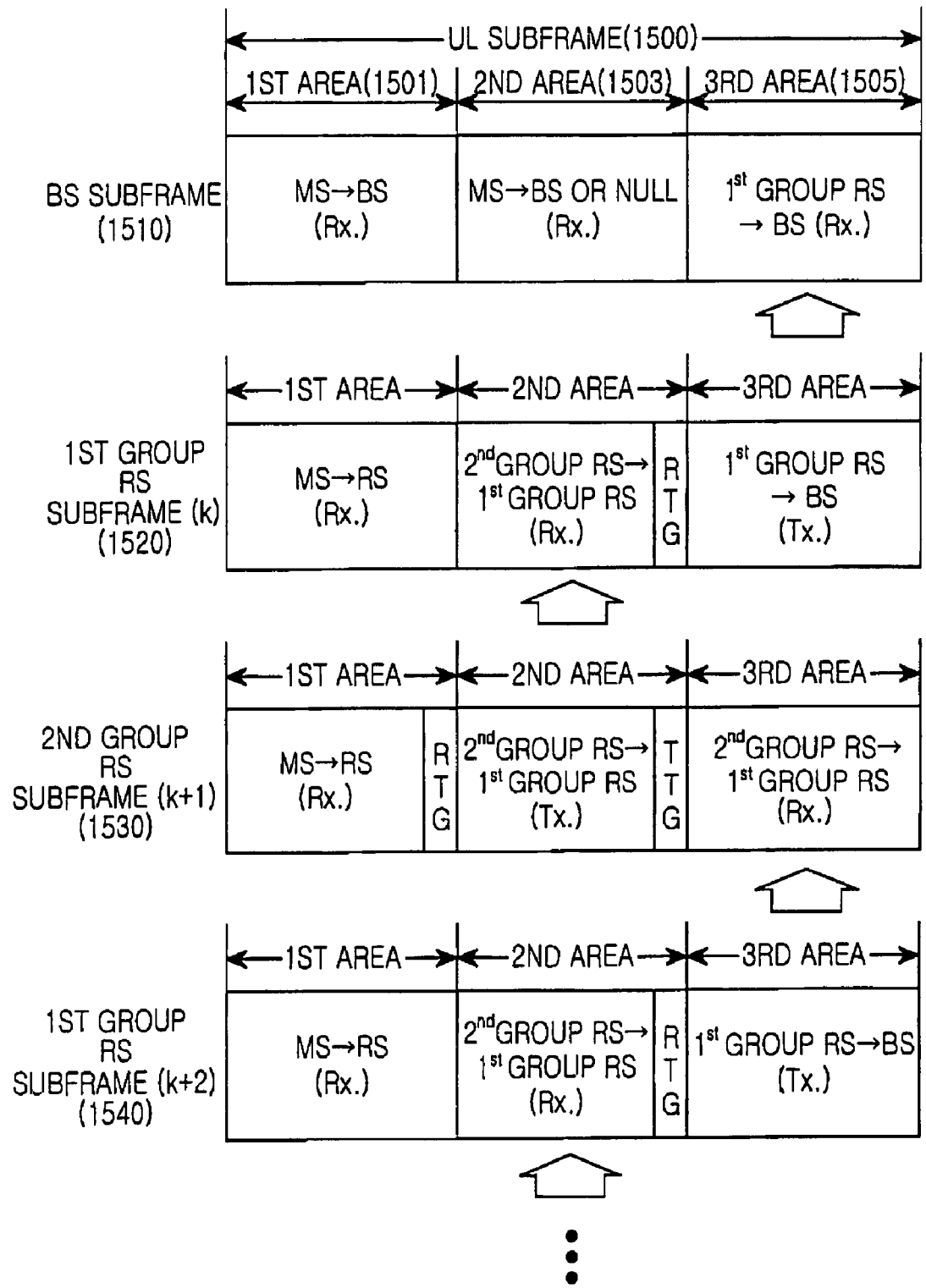
FIG. 15 illustrates a UL subframe structure in the multi-hop relay BWA communication system according to the present invention.
Figure 16:
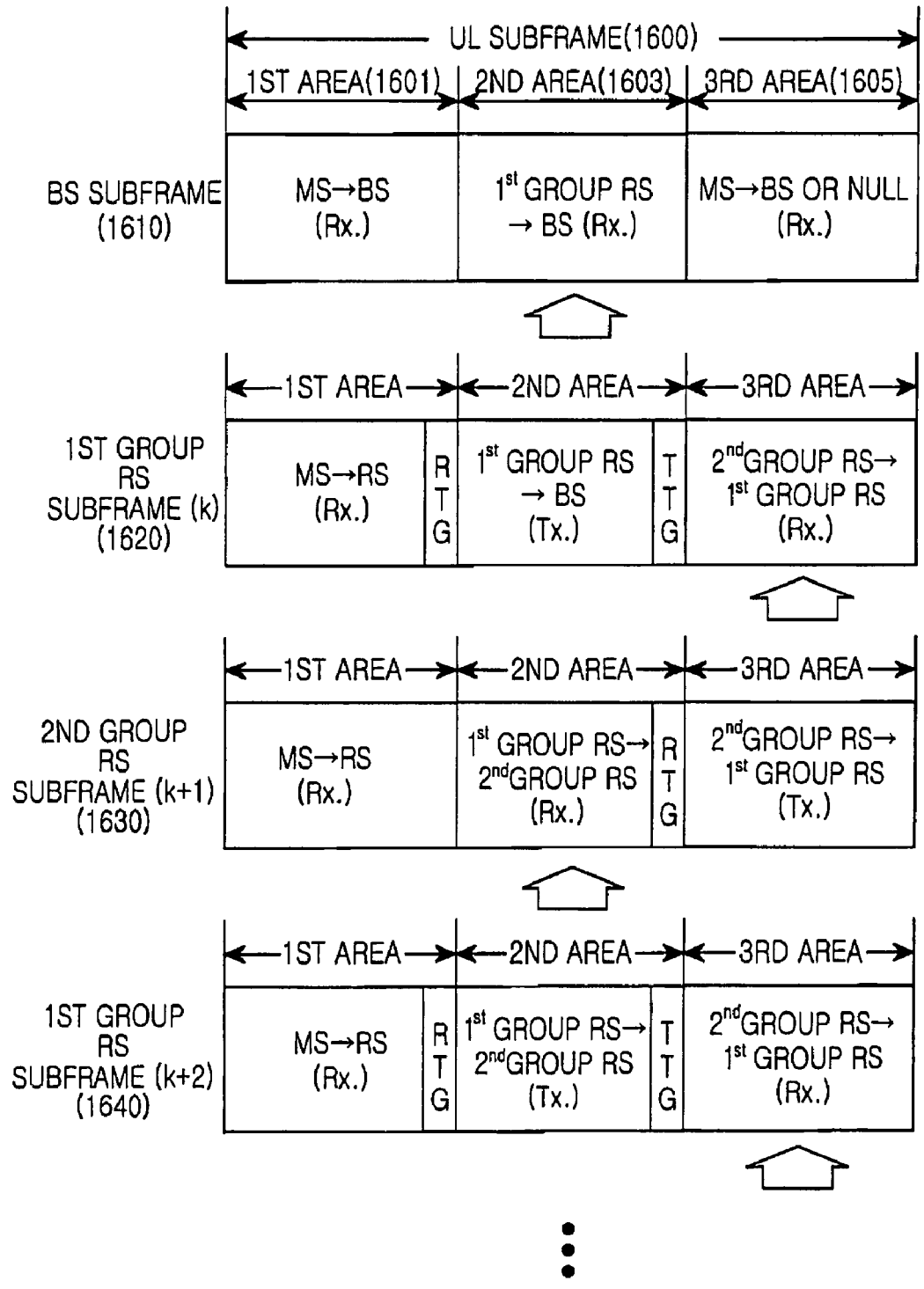
FIG. 16 illustrates a UL subframe structure in the multi-hop relay BWA communication system according to the present invention.

The BWA communication system configures a UL subframe as illustrated in FIG. 15 or FIG. 16.

FIG. 15 illustrates a UL subframe structure in the multi-hop relay BWA communication system according to the present invention.

In FIG. 15, each UL subframe 1500 includes a time-multiplexed first, second, and third areas 1501, 1503 and 1505.

In a BS subframe 1510, the BS receives the uplink subframes from the MSs within its service area in the first and second areas 1501 and 1503. To avoid interference between the MSs and an RS, null data can be filled in the second area 1503, instead of the uplink subframe. The BS receives an uplink subframe from a 1-hop RS of the 1$^{st}$ group in the third area 1505.

In 1$^{st}$ group RS subframes 1520 and 1540, a 1$^{st}$ group RS receives an uplink subframe from an MS within its service area in the first area 1501. The 1$^{st}$ group RS receives an uplink subframe from a next-hop RS of the 2$^{nd}$ group in the second area 1503. For example, a 1-hop RS of the first group receives an uplink subframe from a 2-hop RS of the second group. A 3-hop RS of the first group receives an uplink subframe from a 4-hop RS of the second group. The 1$^{st}$ group RS sends an uplink subframe to a previous-hop RS of the second group in the third area 1505. If the 1$^{st}$ group RS is the 1-hop RS, the 1$^{st}$ group RS sends an uplink subframe to the BS in the third area 1505. For an operation transition of the 1$^{st}$ group RS, an RTG is interposed between the second area 1503 and the third area 1505.

In a 2$^{nd}$ group RS frame 1530, a 2$^{nd}$ group RS receives an uplink subframe from an MS within its service area in the first area 1501. The 2$^{nd}$ group RS sends an uplink subframe to a previous-hop RS of the 1$^{st}$ group in the second area 1503. The 2$^{nd}$ group RS receives an uplink subframe from a next-hop RS of the 1$^{st}$ group in the third area 1505. For operation transitions of the 2$^{nd}$ group RS, an RTG exists between the first area 1501 and the second area 1503 and a TTG is interposed between the second area 1503 and the third area 1505.

While not shown, if a last-hop RS belongs to the first group, the last-hop RS receives the uplink subframes from the MSs within its service area in the first and second areas 1501 and 1503. To avoid interference between the MSs and the RS, the second area 1503 may have null data. The last-hop RS sends an uplink subframe to a previous-hop RS of the 2$^{nd}$ group in the third area 1505.

If the last-hop RS is a 2$^{nd}$ group RS, it receives uplink subframes from the MSs within its service area in the first and third areas 1501 and 1505. To avoid interference between the MSs and the RS, the third area 1505 may have null data. The last-hop RS sends an uplink subframe to a previous-hop RS of the 1$^{st}$ group in the second area 1503.

FIG. 16 illustrates a UL subframe structure in the multi-hop relay BWA communication system according to the present invention.

In FIG. 16, each UL subframe 1600 includes a time-multiplexed first, second, and third areas 1601, 1603, and 1605, respectively.

In a BS subframe 1610, the BS receives the uplink subframes from the MSs within its service area in the first and third areas 1601 and 1605. To avoid interference between an MS and an RS, null data can be filled in the third area 1605, instead of the UL subframe. The BS receives an uplink subframe from a 1-hop RS of the $1^{st}$ group in the second area 1603.

In $1^{st}$ group RS subframes 1620 and 1640, a $1^{st}$ group RS receives an uplink subframe from an MS within its service area in the first area 1601. The $1^{st}$ group RS sends an uplink subframe to a previous-hop RS of the second group in the second area 1603. If the $1^{st}$ group RS is a 1-hop RS, the $1^{st}$ group RS sends an uplink subframe to the BS in the second area 1603. In the third area 1605, the $1^{st}$ group RS receives an uplink subframe from a next-hop RS of the $2^{nd}$ group. For operation transitions of the $1^{st}$ group RS, an RTG is interposed between the first area 1601 and the second area 1603 and a TTG exists between the second area 1603 and the third area 1605.

In a $2^{nd}$ group RS frame 1630, a $2^{nd}$ group RS receives an uplink subframe from an MS within its service area in the first area 1601. The $2^{nd}$ group RS receives an uplink subframe from a next-hop RS of the $1^{st}$ group in the second area 1603 and sends an uplink subframe to a previous-hop RS of the $1^{st}$ group in the third area 1605.

While not shown, if a last-hop RS belongs to the first group, the last-hop RS receives the uplink subframes from the MSs within its service area in the first and third areas 1601 and 1605. To avoid interference between the MSs and the RS, the third area 1605 may have null data. The last-hop RS sends an uplink subframe to a previous-hop RS of the $2^{nd}$ group in the second area 1603.

If the last-hop RS is a $2^{nd}$ group RS, the last-hop RS receives the uplink subframes from the MSs within its service area in the first and second areas 1601 and 1603. To avoid interference between the MSs and the RS, the second area 1603 may have null data. The last-hop RS sends an uplink subframe to a previous-hop RS of the $1^{st}$ group in the third area 1605.

The BWA communication system may configure a frame by combining the DL subframe illustrated in FIG. 11 and the UL subframe illustrated in FIG. 15 or FIG. 16. On the other hand, the BWA communication system may configure a frame by combining the DL subframe illustrated in FIG. 13 and the UL subframe illustrated in FIG. 15 or FIG. 16.

As described above, the BS sends a synchronization channel to the MSs and the 1-hop RSs according to a frame configuration in the BWA communication system. The $1^{st}$ group RSs send synchronization channels to the MSs and the $2^{nd}$ group RSs according to the frame configuration. The $2^{nd}$ group RSs provide synchronization channels to the MSs and the next-hop RSs of the first group according to the frame configuration.

The BS, the $1^{st}$ group RSs, and the $2^{nd}$ group RSs send the synchronization channels in every frame or in every predetermined number of frames. Alternatively, they may include the synchronization channels in frames indicated by a control signal. The control signal contains a Frame Control Header (FCH), a MAP, and a Downlink Channel Descriptor (DCD).

Now a description will be made of operations of the BS, RS1, RS2, and the MS to communicate using the frame configurations described above in the BWA communication system.

Figure 17:
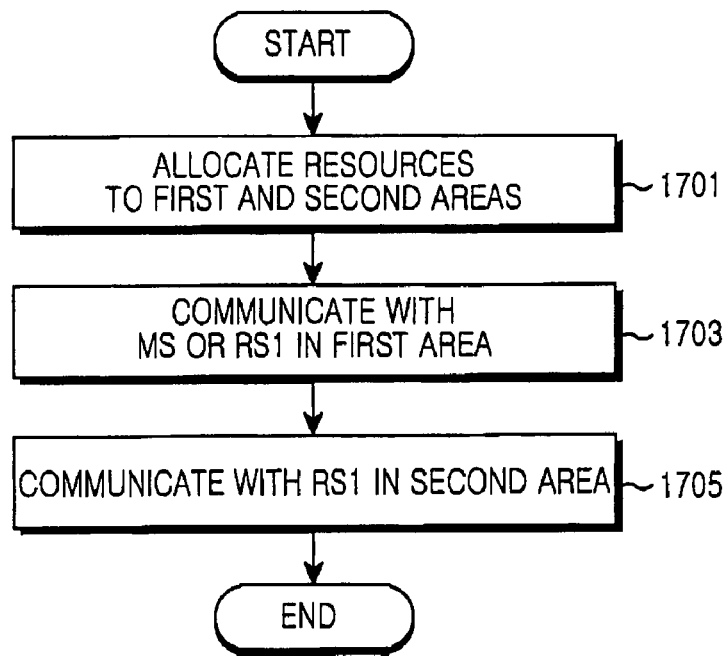
FIG. 17 is a flow diagram illustrating a process of a BS in the multi-hop relay BWA communication system according to the present invention.

FIG. 17 is a flow diagram illustrating a process of the BS in the multi-hop relay BWA communication system according to the present invention.

In FIG. 17, the BS defines a direct-link area and a relay-link area in each of the DL and UL subframes in step 1701. For example, if the BWA communication system spans two hops, a first area for the direct link and a second area for the relay link are defined in each of the DL and UL subframes. If the BWA communication system spans three hops, a first area for the direct link and second and third areas for the relay link are defined in each of the DL and UL subframes.

In step 1703, the BS communicates with an MS and RS2 within its service area in the direct-link area. The BS provides a BS synchronization channel to the MS at the start of the direct-link area. For example, if a frame has the configuration illustrated in FIG. 6, FIG. 7, or FIG. 9, the BS communicates with the MS in the first areas.

If the DL subframe and the UL subframe have the configurations illustrated in FIG. 11 and FIG. 15, respectively, the BS communicates with the MS in the first areas or the second areas. If the DL subframe and the UL subframe have the configurations illustrated in FIG. 13 and FIG. 16, respectively, the BS communicates with the MS in the first areas or the third areas.

The BS communicates with a 1-hop RS in the relay-link area in step 1705. For the 1-hop RS, the BS provides an RS synchronization channel at the end of the relay-link area.

For example, if the frame has the configuration illustrated in FIG. 6, FIG. 7 or FIG. 9, the BS communicates with the 1-hop RS in the second areas. Thus, the BS provides the synchronization channel to the 1-hop RS at the end of the second area of the DL subframe.

If the DL subframe and the UL subframe have the configurations illustrated in FIG. 11 and FIG. 15, respectively, the BS communicates with the 1-hop RS in the third areas. Thus, the BS provides the synchronization channel to the 1-hop RS at the end of the third area of the DL subframe.

If the DL subframe and the UL subframe have the configurations illustrated in FIG. 13 and FIG. 16, respectively, the BS communicates with the 1-hop RS in the second areas. Thus, the BS provides the synchronization channel to the 1-hop RS at the end of the second area of the DL subframe.

Then, the BS ends the process.

Figure 18:
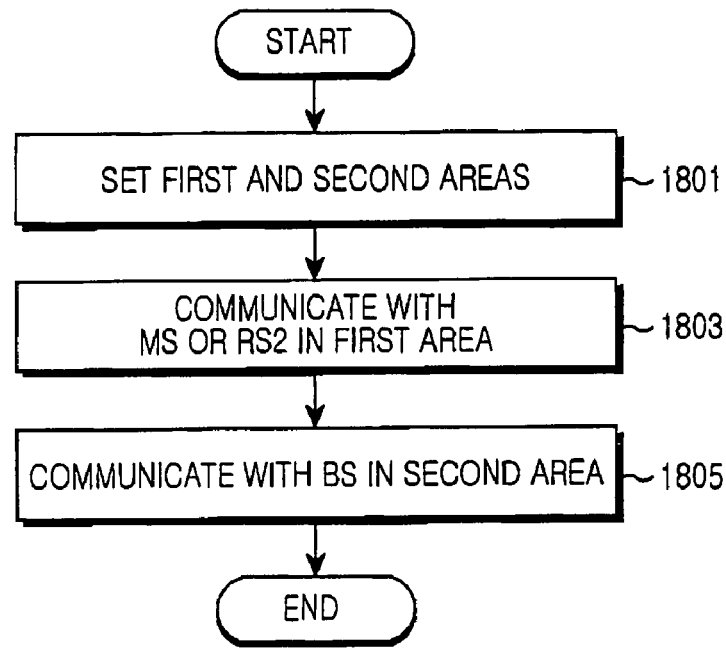
FIG. 18 is a flow diagram illustrating a process of a RS1 in the multi-hop relay BWA communication system according to the present invention.

FIG. 18 is a flow diagram illustrating a process of the RS1 in the multi-hop relay BWA communication system according to the present invention.

In FIG. 18, the RS1 checks the subframe configuration information, i.e. configuration information about direct-link areas and relay-link areas in the DL and UL subframes received from the BS or an upper RS in step 1801. If a frame has the configuration illustrated in FIG. 6, FIG. 7, or FIG. 9, the RS1 checks the configuration information concerning the first and second areas.

If a DL subframe has the configuration illustrated in FIG. 11 or FIG. 13 and a UL subframe has the configuration illustrated in FIG. 15 or FIG. 16, the RS1 checks configuration information about the first, second, and third areas.

In step 1803, the RS1 communicates with an MS or a RS2 within its service area in the first areas for the direct link. For the MS, the RS1 provides a synchronization channel at the start of the first area in the DL subframe.

The RS1 communicates with the BS or multi-hop RSs in the relay-link areas in step 1805. For the lower RSs, RS1 provide a synchronization channel at the end of an area for communicating with the lower RSs in the DL subframe. If the frame has the configuration illustrated in FIG. 6, FIG. 7, or FIG. 9, RS1 communicates with the BS in the second areas.

If the DL subframe and the UL subframe of the frame have the configurations illustrated in FIG. 11 and FIG. 15, respectively, the RS1 communicates with the lower RSs in the second areas and communicates with the BS or the upper RSs in the third areas. The RS1 provides the synchronization channel to the lower RSs at the end of the second area in the DL subframe.

If the DL subframe and the UL subframe of the frame have the configurations illustrated in FIG. 13 and FIG. 16, respectively, the RS1 communicates with the lower RSs in the third areas and communicates with the BS or the upper RSs in the second areas. The RS1 provides the synchronization channel for the lower RSs at the end of the third area in the DL subframe.

Then the RS1 ends the process.

Figure 19:
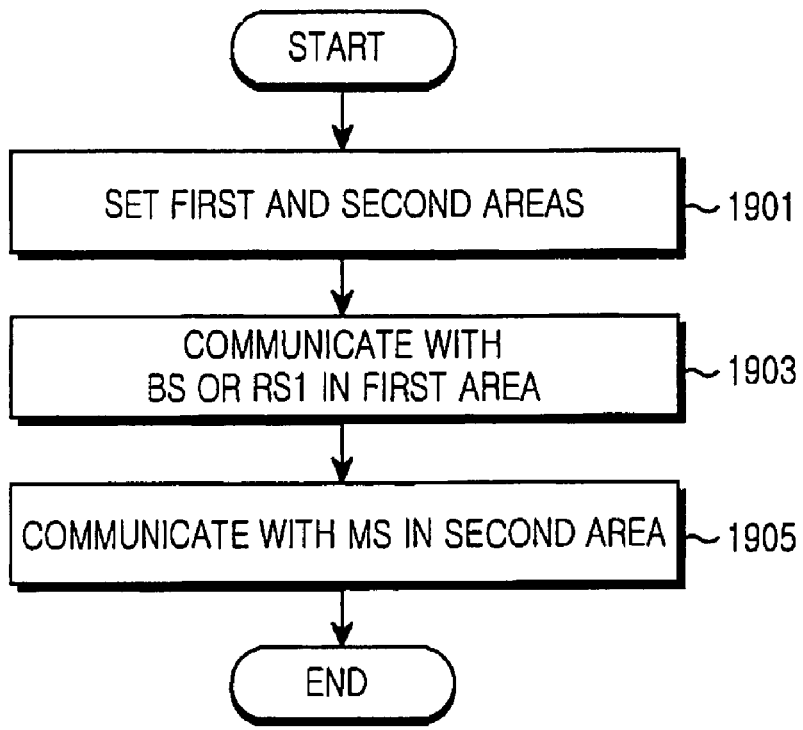
FIG. 19 is a flow diagram illustrating a process of a RS2 in the multi-hop relay BWA communication system according to the present invention.

FIG. 19 is a flow diagram illustrating an operation of the RS2 in the multi-hop relay BWA communication system according to the present invention.

In FIG. 19, the RS2 checks the control information and the subframe configuration information formed according to its relay capability, received from the BS in step 1901. For example, if a frame is configured as illustrated in FIG. 7 or FIG. 9, the RS2 checks the information tconcerning the first and second areas and the RS2-MS link areas of the second areas.

In step 1903, the RS2 communicates with the BS in the first area. The RS2 then communicates with an MS that receives a relay service via the RS2 in the second area in step 1905.

For example, the RS2 receives a signal from the BS in the first area and sends a signal to the MS in the second area of a DL subframe. In a UL subframe, the RS2 sends a signal to the BS in the first area and receives a signal from the MS in the second area.

Then the RS2 ends the process.

Figure 20:
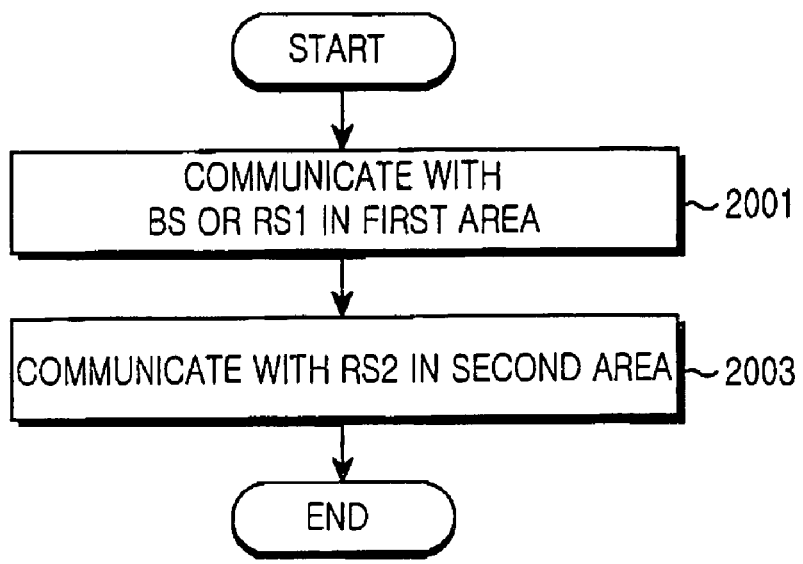
FIG. 20 is a flow diagram illustrating a process of an MS in the multi-hop relay BWA communication system according to the present invention.

FIG. 20 is a flow diagram illustrating an operation of the MS in the multi-hop relay BWA communication system according to the present invention.

In FIG. 20, the MS communicates with the BS or the RS1 in the first area in step 2001.

In step 2003, the MS communicates with RS2 in the second area. For example, in a DL subframe, the MS receives a signal from the BS or RS1 in the first area and receives a signal from the RS2 in the second area. In a UL subframe, the MS sends a signal to the BS or RS1 in the first area and a signal to the RS2 in the second area.

Then the MS ends the process.

It has been described above that each single-directional subframe is divided into the first and second areas or the first, second, and third areas which are time-division-multiplexed in a TDD system. In another exemplary embodiment of the present invention, the single-directional subframe is divided into first and second areas or first, second, and third areas which are frequency-division-multiplexed in a Frequency Division Duplex (FDD) system. In the FDD system, the DL subframe and the UL subframe are sent/received simultaneously in different frequency bands.

A description will now be made of the structures of the BS and an RS for providing a relay service in the BWA communication system. Because the BS and the RS have the same configuration, their structures will be described, taking a BS configuration illustrated in FIG. 21. The following description is made with the appreciation that signal transmission and reception are carried out using a single transceiver in the BS and the RS.

Figure 21:
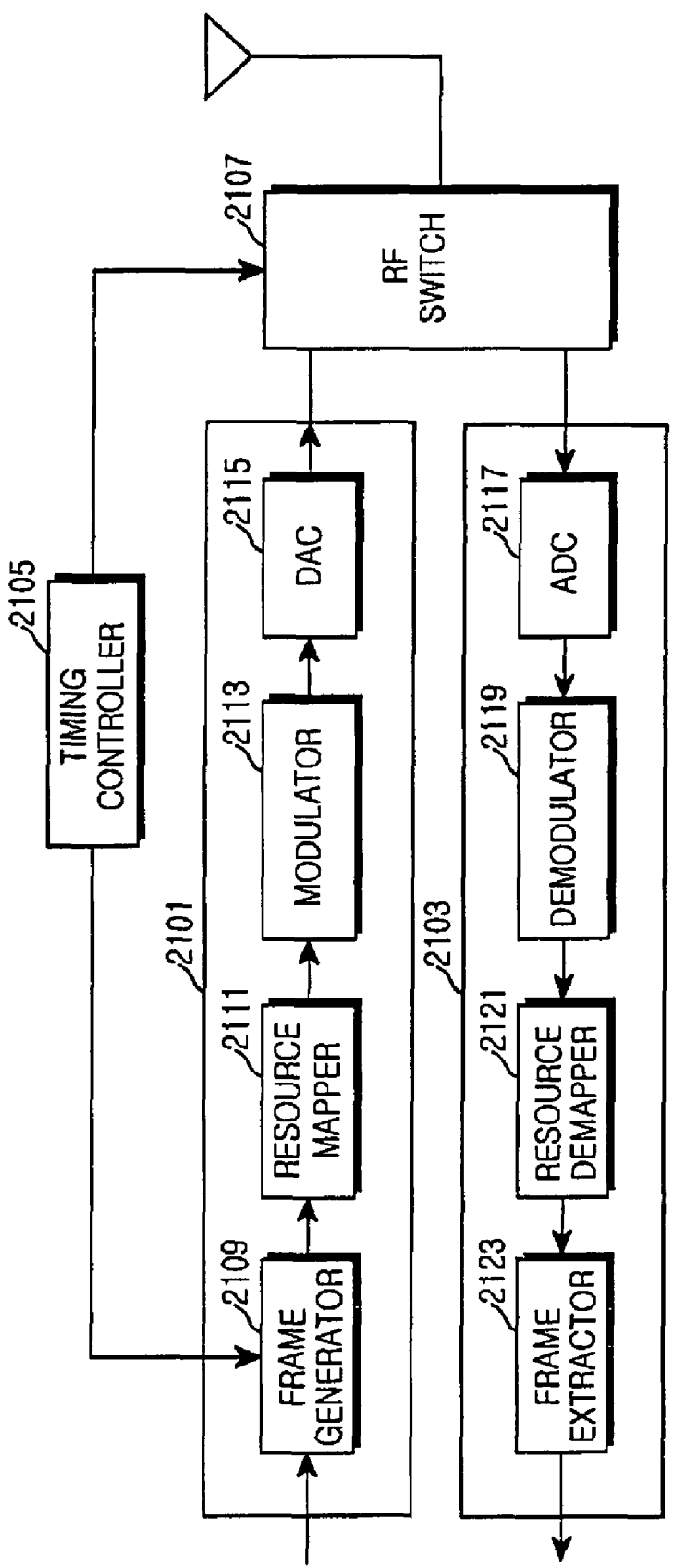
FIG. 21 is a block diagram of the BS in the multi-hop relay BWA communication system according to the present invention.

FIG. 21 is a block diagram of the BS in the multi-hop relay BWA communication system according to the present invention.

In FIG. 21, the BS includes a transmitter 2101, a receiver 2103, a timing controller 2105, and an RF switch 2107.

The transmitter 2101 has a frame generator 2109, a resource mapper 2111, a modulator 2113, and a Digital-to-Analog Converter (DAC) 2115.

In operation, the frame generator 2109 configures a DL subframe to send synchronization channels, control channels, and traffic bursts to an MS and a lower RS within the service area of the BS under the timing controller 2105. Notably, the frame generator 2109 provides a synchronization channel for the MS at the start of a subframe for the MS and a synchronization channel for the lower RS at the end of a subframe for the lower RS in the DL subframe.

If the BWA communication system spans two hops, the frame generator 2109 configures a subframe to be sent to the MS or the RS2 in a first area of the DL subframe. Then the frame generator 2109 configures a subframe to be sent to a 1-hop RS in a second area of the DL subframe. The frame generator 2109 positions the synchronization channels at the start of the subframe in the first area and at the end of the subframe in the second area.

If the BWA communication system spans three or more hops, the frame generator 2109 configures a subframe to be sent to the MS or RS2 in a first area or first and second areas of the DL subframe. Then, the frame generator 2109 configures a subframe to be sent to the 1-hop RS in a third area of the DL subframe. The frame generator 2109 positions the synchronization channels at the start of the subframe in the first area and at the end of the subframe in the third area.

The resource mapper 2111 maps the subframes received from the frame generator 2109 to bursts for links corresponding to the subframes.

The modulator 2113 modulates the mapped subframes in a predetermined modulation scheme.

The DAC 2115 converts the modulated digital signal to an analog signal and provides the analog signal to the RF switch 2107.

The receiver 2103 includes an Analog-to-Digital Converter (ADC) 2117, a demodulator 2119, a resource demapper 2121, and a frame extractor 2123.

The ADC 2117 converts an analog signal received through the RF switch 2107 to a digital signal. The demodulator 2119 demodulates the digital signal in a predetermined demodulation scheme.

The resource demapper 2121 extracts subframes from link bursts received from the demodulator. The frame extractor 2123 extracts a subframe destined for the BS from the subframes.

The RF switch 2107 switches signals to be sent to or received from the MS, RS1, and RS2 to the transmitter 2101 and the receiver 2103 under the control of the timing controller 2105.

The timing controller 2105 controls transmission and reception timings at which the BS communicates with the MS and the lower RS according to a frame configuration.

The configuration of the RS1 will be described with reference to FIG. 21.

In FIG. 21, the RS1 includes the transmitter 2101, the receiver 2103, the timing controller 2105, and the RF switch 2107.

The transmitter 2101 has the frame generator 2109, the resource mapper 2111, the modulator 2113, and the DAC 2115.

In operation, the frame generator 2109 configures a DL subframe to send synchronization channels, control channels, and traffic bursts to an MS and a lower RS within the service area of the RS1 under the timing controller 2105. Notably, the frame generator 2109 provides a synchronization channel for the MS at the start of a subframe for the MS and a synchronization channel for the lower RS at the end of a subframe for the lower RS in the DL subframe.

The frame generator 2109 also generates a UL subframe in which to communicate with the BS or an upper RS.

The resource mapper 2111 maps the subframes received from the frame generator 2109 to bursts for links corresponding to the subframes.

The modulator 2113 modulates the mapped subframes in a predetermined modulation scheme.

The DAC 2115 converts the modulated digital signal to an analog signal and provides the analog signal to the RF switch 2107.

The receiver 2103 includes the ADC 2117, the demodulator 2119, the resource demapper 2121, and the frame extractor 2123.

The ADC 2117 converts an analog signal received through the RF switch 2107 to a digital signal. The demodulator 2119 demodulates the digital signal in a predetermined demodulation scheme.

The resource demapper 2121 extracts subframes from link bursts received from the demodulator. The frame extractor 2123 extracts a subframe destined for the BS from the subframes.

The RF switch 2107 switches signals to be sent to or received from the BS, the MS, the lower RS, and the upper RS to the transmitter 2101 and the receiver 2103 under the control of the timing controller 2105.

The timing controller 2105 controls transmission and reception timings at which the RS1 communicates with the BS, the MS, the lower RS, and the upper RS according to a frame configuration.

As described above, the multi-hop relay BWA communication system provides synchronization channels to the MSs and the RSs. Therefore, the RSs facilitate synchronization and cell search. Also, time multiplexing between a relay service and a direct service within a cell eliminates near-far interference between them.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for configuring a subframe in order to support a relay service in a wireless communication system, comprising:
    configuring at least one of a Base Station (BS)-Mobile Station (MS) link subframe, a primary Relay Station (RS)-MS link subframe, and a BS-secondary RS link subframe in a first period of the subframe, the BS-MS link subframe being a subframe for a link between a BS and an MS, the primary RS-MS link subframe being a subframe for a link between a primary RS that provides a synchronization channel and an MS, and the BS-secondary RS link subframe being a subframe for a link between the BS and a secondary RS that does not provide a synchronization channel; and
    configuring at least one of a BS-primary RS link subframe, an RS-RS link subframe, and a secondary RS-MS link subframe in a second period of the subframe, the BS-primary RS link subframe being a subframe for a link between the BS and the primary RS, an RS-RS link subframe being a subframe for a link between an RS and another RS, and a secondary RS-MS link subframe being a subframe for a link between the secondary RS and an MS.

2. The method of claim 1, wherein the first period and the second period are distinguished by one of time division and frequency division in the subframe.

3. The method of claim 1, wherein the lengths of the first period and the second period in the subframe are one of fixed and dynamically changed according to a channel environment.

4. The method of claim 1, wherein the subframe is a downlink subframe, wherein the subframe configuration in the first period of the subframe comprises providing a synchronization channel at the start of the first period in the downlink subframe and the subframe configuration in the second period of the subframe comprises providing a synchronization channel at the end of the second period in the downlink subframe.

5. The method of claim 1, wherein the subframe is an uplink subframe, wherein the subframe configuration in the first period of the subframe comprises providing a ranging channel at the start of the first period in the uplink subframe and the subframe configuration in the second period of the subframe comprises providing a ranging channel at the end of the second period in the uplink subframe.

6. The method of claim 1, wherein the subframe configuration in the first period of the subframe comprises configuring the BS-MS link subframe, the primary RS-MS link subframe, and the BS-secondary RS link subframe by one of Frequency Division Multiple Access (FDMA), Spatial Division Multiple Access (SDMA), and Orthogonal Frequency Division Multiple Access (OFDMA).

7. The method of claim 1, wherein the subframe configuration in the first period of the subframe comprises configuring the BS-MS link subframe, the primary RS-MS link subframe, and the BS-secondary RS link subframe in the same structure.

8. The method of claim 1, further comprising, if the secondary RS is a lower RS to the primary RS, configuring a primary RS-secondary RS link subframe being a subframe for a link between the primary RS and the second RS in the first period of the subframe.

9. The method of claim 1, wherein the subframe configuration in the second period of the subframe comprises configuring at least one of the BS-primary RS link subframe, at least one RS-RS link subframe, and the secondary RS-MS link subframe in the second period of the subframe.

10. The method of claim 9, wherein if the at least one RS-RS link subframe is a downlink subframe for sending a signal from an upper RS to a lower RS, the subframe configuration in the second period of the subframe further comprises providing a synchronization channel at the end of the least one RS-RS link subframe.

11. The method of claim 1, wherein the subframe configuration in the second period of the subframe comprises configuring the BS-primary RS link subframe, the RS-RS link subframe, and the secondary RS-MS link subframe by one of FDMA, SDMA, and OFDMA.

12. A method for configuring a downlink subframe in order to support a relay service in a wireless communication system, comprising:
    configuring a Base Station (BS)-Mobile Station (MS) link subframe and a Relay Station (RS)-MS link subframe in a first period of the downlink subframe, the BS-MS link subframe being a subframe for a link between a BS and an MS and the RS-MS link subframe being a subframe for a link between an RS and an MS;

configuring a $1^{st}$ group RS-$2^{nd}$ group next-hop RS link subframe in a second period of the downlink subframe, the $1^{st}$ group RS-$2^{nd}$ group next-hop RS link subframe being a subframe for a link between an RS of a first group including odd-hop RSs and a next-hop RS of a second group including even-hop RSs; and configuring a BS-1-hop RS link subframe and a $2^{nd}$ group RS-$1^{st}$ group next-hop RS link subframe in a third period of the downlink subframe, the BS-1-hop RS link subframe being a subframe for a link between the BS and a 1-hop RS and the $2^{nd}$ group RS-$1^{st}$ group next-hop RS link subframe being a subframe for a link between an RS of the second group and a next-hop RS of the first group.

13. The method of claim 12, wherein the first period, the second period, and the third period are distinguished by time division in the downlink subframe.

14. The method of claim 12, wherein the subframe configuration in the first period of the downlink subframe comprises providing a synchronization channel at the start of the BS-MS link subframe and a synchronization channel at the start of the RS-MS link subframe in the first period of the downlink subframe.

15. The method of claim 12, wherein the subframe configuration in the second period of the downlink subframe comprises providing a synchronization channel at the end of the $1^{st}$ group RS-$2^{nd}$ group next-hop RS link subframe in the second period of the downlink subframe.

16. The method of claim 15, wherein the subframe configuration in the second period of the downlink subframe comprises providing the synchronization channel before a guard region between the second period and the third period of the downlink subframe.

17. The method of claim 15, wherein the subframe configuration in the second period of the downlink subframe comprises providing the synchronization channel in one of every frame and a predetermined frame.

18. The method of claim 17, wherein the predetermined frame is set according to one of a predetermined period and a control signal.

19. The method of claim 12, wherein the subframe configuration in the third period of the subframe comprises providing a synchronization channel at the end of the BS-1-hop RS link subframe and a synchronization channel at the end of the $2^{nd}$ group RS-$1^{st}$ group next-hop RS link subframe.

20. The method of claim 19, wherein the subframe configuration in the third period of the downlink subframe comprises providing the synchronization channel in one of every frame and a predetermined frame.

21. The method of claim 20, wherein the predetermined frame is set according to one of a predetermined period and a control signal.

22. The method of claim 12, further comprising:
configuring a BS-MS link subframe and a $1^{st}$ group last-hop RS-MS link subframe in the second period of the downlink subframe, the BS-MS link subframe being a subframe for a link between the BS and an MS and the $1^{st}$ group last-hop RS-MS link subframe being a subframe for a link between a last-hop RS included in the first group and an MS; and
configuring a $2^{nd}$ group last-hop RS-MS link subframe in the third period of the downlink subframe, the $2^{nd}$ group last-hop RS-MS link subframe being a subframe for a link between a last-hop RS included in the second group and an MS.

23. A method for configuring a downlink subframe in order to support a relay service in a wireless communication system, comprising:

configuring a Base Station (BS)-Mobile Station (MS) link subframe and a Relay Station (RS)-MS link subframe in a first period of the downlink subframe, the BS-MS link subframe being a subframe for a link between a BS and an MS and the RS-MS link subframe being a subframe for a link between an RS and an MS;

configuring a BS-1-hop RS link subframe and a $2^{nd}$ group RS-$1^{st}$ group next-hop RS link subframe in a second period of the downlink subframe, the BS-1-hop RS link subframe being a subframe for a link between the BS and a 1-hop RS and the $2^{nd}$ group RS-$1^{st}$ group next-hop RS link subframe being a subframe for a link between an RS of a second group including even-hop RSs and a next-hop RS of a first group including odd-hop RSs; and configuring a $1^{st}$ group RS-$2^{nd}$ group next-hop RS link subframe in a third period of the downlink subframe, the $1^{st}$ group RS-$2^{nd}$ group next-hop RS link subframe being a subframe for a link between an RS of the first group and a next-hop RS of the second group.

24. The method of claim 23, wherein the first period, the second period, and the third period are distinguished by time division in the downlink subframe.

25. The method of claim 23, wherein the subframe configuration in the first period of the downlink subframe comprises providing a synchronization channel at the start of the BS-MS link subframe and a synchronization channel at the start of the RS-MS link subframe in the first period of the downlink subframe.

26. The method of claim 23, wherein the subframe configuration in the second period of the downlink subframe comprises providing synchronization channel at the end of the BS-1-hop RS link subframe and a synchronization channel at the end of the $2^{nd}$ group RS-$1^{st}$ group next-hop RS link subframe in the second period of the downlink subframe.

27. The method of claim 26, wherein the subframe configuration in the second period of the downlink subframe comprises providing the synchronization channel before a guard region between the second period and the third period in the downlink subframe.

28. The method of claim 26, wherein the subframe configuration in the second period of the downlink subframe comprises providing the synchronization channel in one of every frame and a predetermined frame.

29. The method of claim 28, wherein the predetermined frame is set according to one of a predetermined period and a control signal.

30. The method of claim 23, wherein the subframe configuration in the third period of the subframe comprises providing a synchronization channel at the end of the $1^{st}$ group RS-$2^{nd}$ group next-hop RS link subframe.

31. The method of claim 30, wherein the subframe configuration in the third period of the downlink subframe comprises providing the synchronization channel in one of every frame and a predetermined frame.

32. The method of claim 31, wherein the predetermined frame is set according to one of a predetermined period and a control signal.

33. The method of claim 23, further comprising:
configuring a $2^{nd}$ group last-hop RS-MS link subframe in the second period of the downlink subframe, the $2^{nd}$ group last-hop RS-MS link subframe being a subframe for a link between a last-hop RS included in the second group and an MS; and
configuring a BS-MS link subframe and a $1^{st}$ group last-hop RS-MS link subframe in the third period of the downlink subframe, the BS-MS link subframe being a subframe for a link between the BS and an MS and the $1^{st}$ group last-hop RS-MS link subframe being a subframe for a link between a last-hop RS included in the first group and an MS.

34. A method for configuring an uplink subframe in a wireless communication system, comprising:
   configuring a Mobile Station (MS)-Base Station (BS) link subframe and an MS-Relay Station (RS) link subframe in a first period of the uplink subframe, the MS-BS link subframe being a subframe for a link between an MS and a BS and the MS-RS link subframe being a subframe for a link between an MS and an RS;
   configuring a $2^{nd}$ group RS-$1^{st}$ group previous-hop RS link subframe in a second period of the uplink subframe, the $2^{nd}$ group RS-$1^{st}$ group previous-hop RS link subframe being a subframe for a link between an RS of a second group including even-hop RSs and a previous-hop RS of a first group including odd-hop RSs; and
   configuring a 1-hop RS-BS link subframe and a $1^{st}$ group RS-$2^{nd}$ group previous-hop RS link subframe in a third period of the uplink subframe, the 1-hop RS-BS link subframe being a subframe for a link between a 1-hop RS and the BS and the $1^{st}$ group RS-$2^{nd}$ group previous-hop RS link subframe being a subframe for a link between an RS of the first group and a previous-hop RS of the second group.

35. The method of claim 34, wherein the first period, the second period, and the third period are distinguished by time division in the uplink subframe.

36. The method of claim 34, further comprising:
   configuring an MS-BS link subframe and an MS-$1^{st}$ group last-hop RS-MS link subframe in the second period of the uplink subframe, the MS-BS link subframe being a subframe for a link between an MS and the BS and the MS-$1^{st}$ group last-hop RS link subframe being a subframe for a link between an MS and a last-hop RS included in the first group; and
   configuring an MS-$2^{nd}$ group last-hop RS link subframe in the third period of the uplink subframe, the MS-$2^{nd}$ group last-hop RS link subframe being a subframe for a link between an MS and a last-hop RS included in the second group.

37. A method for configuring an uplink subframe in a wireless communication system, comprising:
   configuring a Mobile Station (MS)-Base Station (BS) link subframe and an MS-Relay Station (RS) link subframe in a first period of the uplink subframe, the MS-BS link subframe being a subframe for a link between an MS and a BS and the MS-RS link subframe being a subframe for a link between an MS and an RS;
   configuring a 1-hop RS-BS link subframe and a $1^{st}$ group RS-$2^{nd}$ group previous-hop RS link subframe in a second period of the uplink subframe, the 1-hop RS-BS link subframe being a subframe for a link between a 1-hop RS and the BS and the $1^{st}$ group RS-$2^{nd}$ group previous-hop RS link subframe being a subframe for a link between an RS of a first group including odd-hop RSs and a previous-hop RS of a second group including even-hop RSs; and
   configuring a $2^{nd}$ group RS-$1^{st}$ group previous-hop RS link subframe in a third period of the uplink subframe, the $2^{nd}$ group RS-$1^{st}$ group previous-hop RS link subframe being a subframe for a link between an RS of the second group and a previous-hop RS of the first group.

38. The method of claim 37, wherein the first period, the second period, and the third period are distinguished by time division in the uplink subframe.

39. The method of claim 37, further comprising:
   configuring an MS-$2^{nd}$ group last-hop RS link subframe in the second period of the uplink subframe, the MS-$2^{nd}$ group last-hop RS link subframe being a subframe for a link between an MS and a last-hop RS included in the second group; and
   configuring an MS-BS link subframe and an MS-$1^{st}$ group last-hop RS-MS link subframe in the third period of the uplink subframe, the MS-BS link subframe being a subframe for a link between an MS and the BS and the MS-$1^{st}$ group last-hop RS link subframe being a subframe for a link between an MS and a last-hop RS included in the first group.

40. A method of a Base Station (BS) in a wireless communication system, comprising:
   allocating resources to a first period and a second period of a subframe, the first period being for communicating with at least one of a Mobile Station (MS) and a secondary Relay Station (RS) that does not provide a synchronization channel and the second period being for communicating with a primary RS that provides a synchronization channel;
   communicating with the at least one of the MS and the secondary RS in the first period of the subframe; and
   communicating with the primary RS in the second period of the subframe.

41. The method of claim 40, wherein the lengths of the first period and the second period of the subframe are one of fixed and dynamically changed according to a channel environment.

42. The method of claim 40, wherein the subframe is a downlink subframe, wherein the communication in the first period comprises providing a synchronization channel at the start of the first period in the downlink subframe and the communication in the second period includes providing a synchronization channel at the end of the second period in the downlink subframe.

43. The method of claim 40, wherein the subframe is an uplink subframe, wherein the communication in the first period comprises providing a ranging channel at the start of the first period in the uplink subframe and the communication in the second period comprises providing a ranging channel at the end of the second period in the uplink subframe.

44. The method of claim 40, wherein the first period and the second period are distinguished by one of time division and frequency division.

45. The method of claim 40, wherein if the RS is a multi-hop RS, the resource allocation comprises dividing the second period into a plurality of periods and allocating resources to the plurality of periods.

46. A method of a Relay Station (RS) that provides a synchronization channel in a wireless communication system, comprising:
   setting a first period and a second period according to control information received from an upper node, the first period being for communicating with a Mobile Station (MS) and the second period being for communicating with at least one of the upper node and a lower RS;
   communicating with the MS in the first period; and
   communicating with the at least one of the upper node and the lower RS in the second period.

47. The method of claim 46, wherein the lengths of the first period and the second period are one of fixed and dynamically changed according to a channel environment.

48. The method of claim 46, wherein the first period and the second period are distinguished by one of time division and frequency division.

49. The method of claim 46, wherein the upper node is one of a Base Station (BS) and an upper RS.

50. The method of claim 46, further comprising communicating with an RS that does not provide a synchronization channel in the first period.

51. The method of claim 46, wherein if the multi-hop relay BWA communication system spans at least three hops, the communication in the second period comprises:
   checking information about segmentation of the second period according to the control information;
   communicating with the lower RS in a first area of the second period; and
   communicating with the upper node in a second area of the second period.

52. The method of claim 51, wherein the communication in the first area of the second period comprises providing the synchronization channel at the end of the first area.

53. The method of claim 46, wherein if the multi-hop relay BWA communication system spans at least three hops, the communication in the second period comprises:
   checking information about segmentation of the second period according to the control information;
   communicating with the upper node in a first area of the second period; and
   communicating with the lower RS in a second area of the second period.

54. The method of claim 53, wherein the communication in the second area of the second period comprises providing the synchronization channel at the end of the second area.

55. An method of a Relay Station (RS) that does not provide a synchronization channel in a wireless communication system, comprising:
   setting a first period and a second period according to control information received from an upper node, the first period being for communicating with the upper node and the second period being for communicating with a Mobile Station (MS);
   communicating with the upper node in the first period; and
   communicating with the MS in the second period.

56. The method of claim 55, wherein the lengths of the first period and the second period are one of fixed and dynamically changed according to a channel environment.

57. The method of claim 55, wherein the first period and the second period are distinguished by one of time division and frequency division.

58. The method of claim 55, wherein the upper node is one of a Base Station (BS) and an upper RS.

59. An apparatus of a Base Station (BS) in a wireless communication system, comprising:
   a timing controller for providing a timing signal for transmission and reception according to a subframe configuration in which a first period and a second period are defined, the first period being for communicating with at least one of a Mobile Station (MS) and a secondary Relay Station (RS) that doest not provide a synchronization channel and the second period being for communicating with a primary RS that provides a synchronization channel;
   a transmitter for generating one of a first period signal and a second period signal according to the timing signal and transmitting the generated signal; and
   a receiver for receiving one of the first period signal and the second period signal according to the timing signal and recovering the received signal.

60. The apparatus of claim 59, wherein the transmitter generates a signal for the at least one of the MS and the secondary RS and transmitting the generated signal to the at least one of the MS and the secondary RS in the first period, and generates a signal for the primary RS and transmitting the generated signal to the primary RS in the second period.

61. The apparatus of claim 59, wherein the transmitter transmits a synchronization channel at the start of the first period and a synchronization channel at the end of the second period.

62. The apparatus of claim 59, wherein the receiver receives a signal from the at least one of the MS and the secondary RS in the first period, and receives a signal from the primary RS in the second period.

63. An apparatus of a Relay Station (RS) that provides a synchronization channel in a wireless communication system, comprising:
   a timing controller for providing a timing signal for transmission and reception according to a subframe configuration in which a first period and a second period are defined, the first period being for communicating with at least one of a Mobile Station (MS) and a secondary RS that doest not provide a synchronization channel and the second period being for communicating with an upper node;
   a transmitter for generating one of a first period signal and a second period signal according to the timing signal and transmitting the generated signal; and
   a receiver for receiving one of the first period signal and the second period signal according to the timing signal and recovering the received signal.

64. The apparatus of claim 63, wherein the transmitter generates a signal for the at least one of the MS and the secondary RS and transmitting the generated signal to the at least one of the MS and the secondary RS in the first period of a downlink subframe, and generates a signal for the upper node and transmitting the generated signal to the upper node in the second period of an uplink subframe.

65. The apparatus of claim 63, wherein the receiver receives a signal from the at least one of the MS and the secondary RS in the first period of an uplink subframe, and receives a signal from the upper node in the second period of a downlink subframe.

66. The apparatus of claim 63, wherein the upper node is one of a Base Station (BS) and an upper RS.

67. An apparatus of a Relay Station (RS) that does not provide a synchronization channel in a wireless communication system, comprising:
   a timing controller for providing a timing signal for transmission and reception according to a subframe configuration in which a first period and a second period are defined, the first period being for communicating with an upper node and the second period being for communicating with a Mobile Station (MS);
   a transmitter for generating one of a first period signal and a second period signal according to the timing signal and transmitting the generated signal; and
   a receiver for receiving one of the first period signal and the second period signal according to the timing signal and recovering the received signal.

68. The apparatus of claim 67, wherein the transmitter generates a signal for the upper node and transmitting the generated signal to the upper node in the first period of an uplink subframe, and generates a signal for the upper node and transmitting the generated signal to the upper node in the second period of a downlink subframe.

69. The apparatus of claim 67, wherein the receiver receives a signal from the upper node in the first period of a downlink subframe, and receives a signal from the MS in the second period of an uplink subframe.

70. The apparatus of claim 67, wherein the upper node is one of a Base Station (BS) and an upper RS.

\* \* \* \* \*